(12) United States Patent
McDonald

(10) Patent No.: US 10,876,655 B2
(45) Date of Patent: Dec. 29, 2020

(54) HOSE CARRIER

(71) Applicant: Dustin McDonald, Hiram, GA (US)

(72) Inventor: Dustin McDonald, Hiram, GA (US)

( * ) Notice: Subject to any disclaimer, the term of this patent is extended or adjusted under 35 U.S.C. 154(b) by 0 days.

(21) Appl. No.: 15/930,800

(22) Filed: May 13, 2020

(65) Prior Publication Data

US 2020/0271242 A1 Aug. 27, 2020

Related U.S. Application Data

(63) Continuation-in-part of application No. 16/503,919, filed on Jul. 5, 2019, now Pat. No. 10,655,758, which is a continuation-in-part of application No. 16/013,897, filed on Jun. 20, 2018, now Pat. No. 10,384,088, which is a continuation-in-part of application No. 15/784,115, filed on Oct. 14, 2017, now Pat. No. 10,077,853.

(60) Provisional application No. 62/414,350, filed on Oct. 28, 2016.

(51) Int. Cl.
*F16L 3/00* (2006.01)
*F16L 3/12* (2006.01)
*F16L 3/18* (2006.01)

(52) U.S. Cl.
CPC ............... *F16L 3/1218* (2013.01); *F16L 3/18* (2013.01)

(58) Field of Classification Search
CPC ..... F16L 3/003; F16L 3/26; F16L 3/00; F16L 3/02; F16L 3/1075; F16L 3/12
USPC ............... 248/68.1, 75, 80, 83, 87, 74.1
See application file for complete search history.

(56) References Cited

U.S. PATENT DOCUMENTS

| | | | | |
|---|---|---|---|---|
| 5,027,478 A | * | 7/1991 | Suhr | B65H 75/36 137/355.16 |
| 7,527,227 B1 | * | 5/2009 | Mondello | A62C 33/00 242/615.2 |
| D597,403 S | * | 8/2009 | Ho | D8/356 |
| 10,128,641 B2 | * | 11/2018 | Cuppen | H02G 3/32 |
| 2001/0028021 A1 | * | 10/2001 | Martin | B65H 57/14 248/87 |
| 2013/0187012 A1 | * | 7/2013 | Blakeley | H02G 3/32 248/68.1 |
| 2014/0259620 A1 | * | 9/2014 | Hicks | F16L 3/223 29/525.01 |
| 2015/0048222 A1 | * | 2/2015 | Eley | A01G 9/28 248/87 |

* cited by examiner

*Primary Examiner* — Steven M Marsh
(74) *Attorney, Agent, or Firm* — Lamon Patent Services; Cynthia S Lamon

(57) ABSTRACT

A roller assembly has a center base element with outer base elements enabled to rotate on each end of the center base element, with a channel through the length of the roller assembly, such that rotating the outer base elements one way opens the channels, such that the roller assembly may be placed on a hose or a conduit, and rotation the other way closes the channel capturing the hose or conduit.

5 Claims, 26 Drawing Sheets

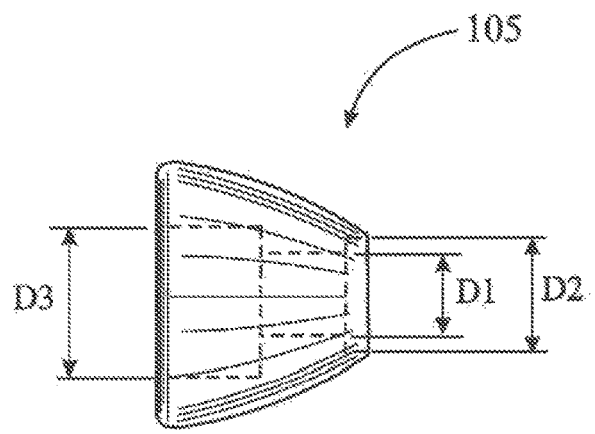
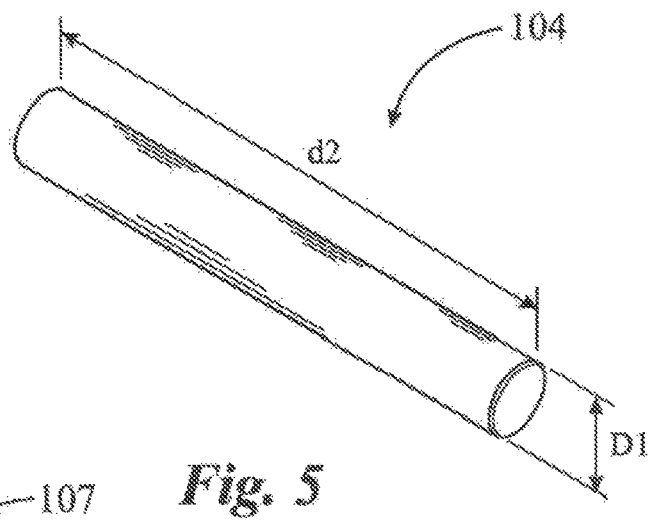
*Fig. 4*
*Fig. 5*
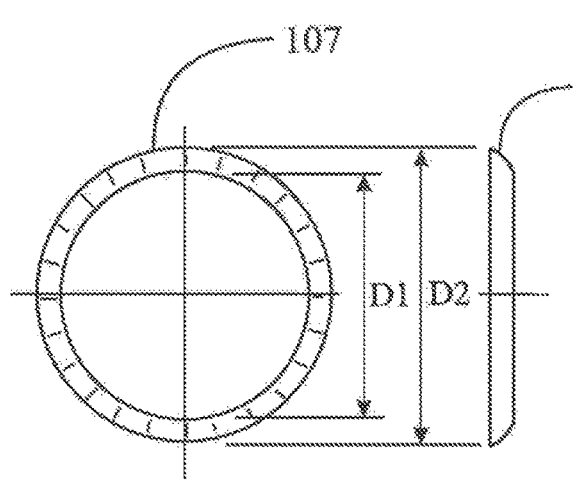
*Fig. 6A*  *Fig. 6B*

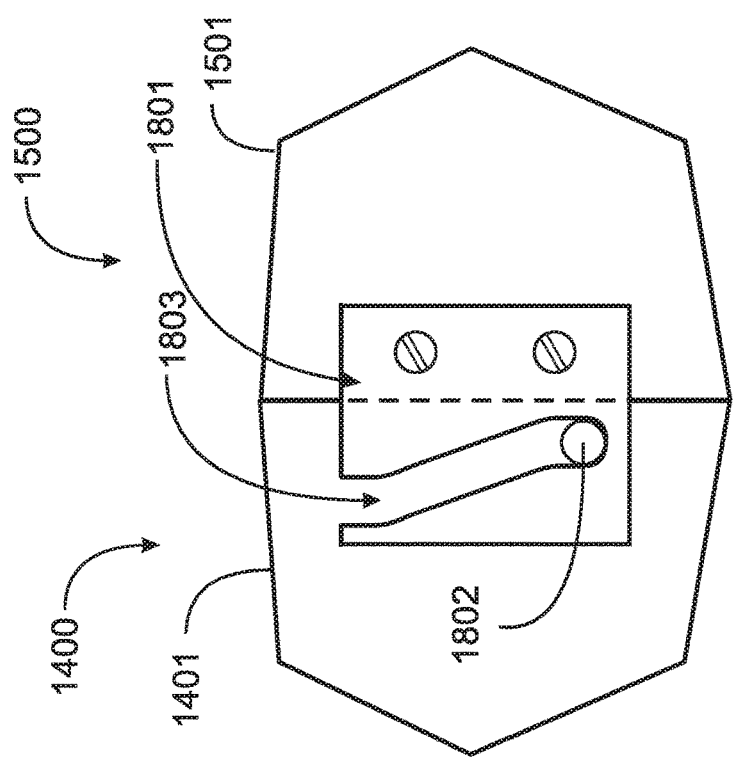
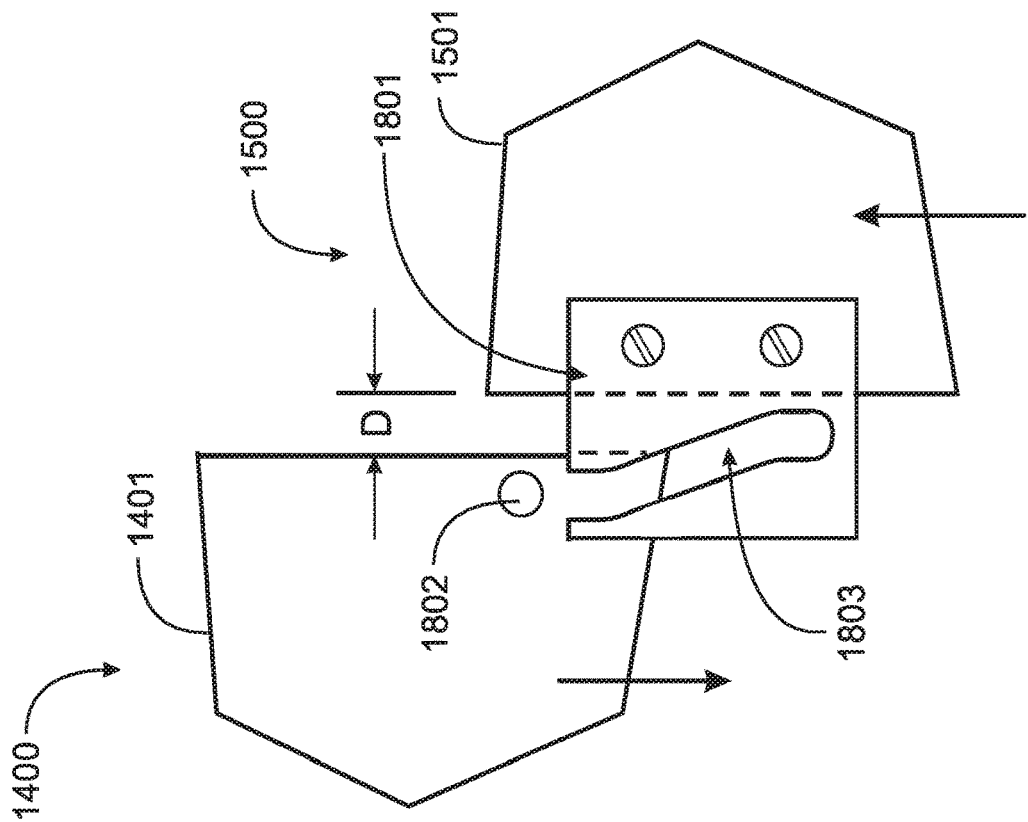

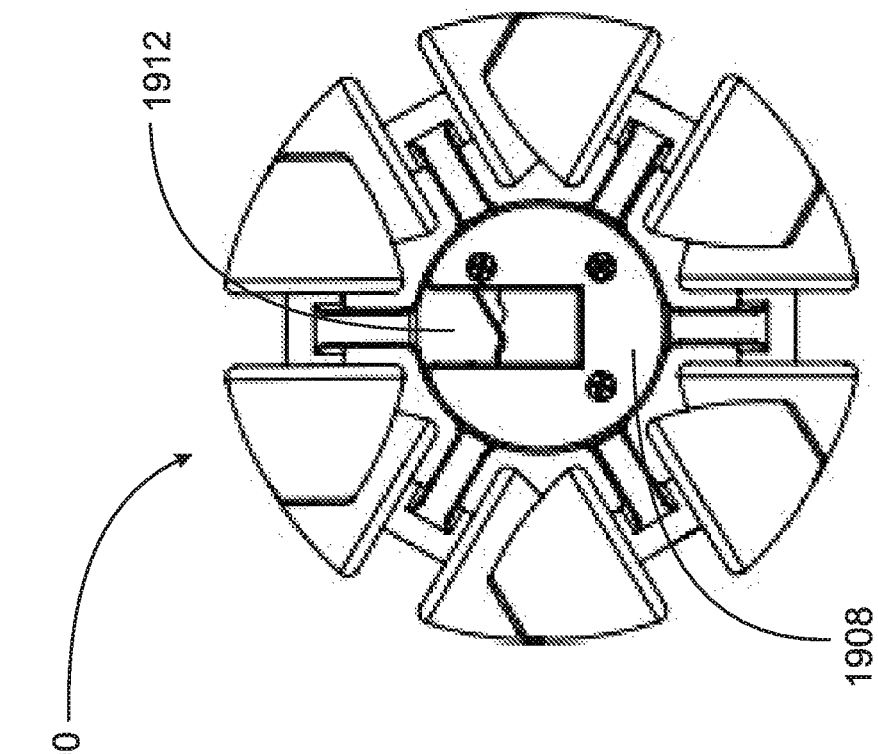
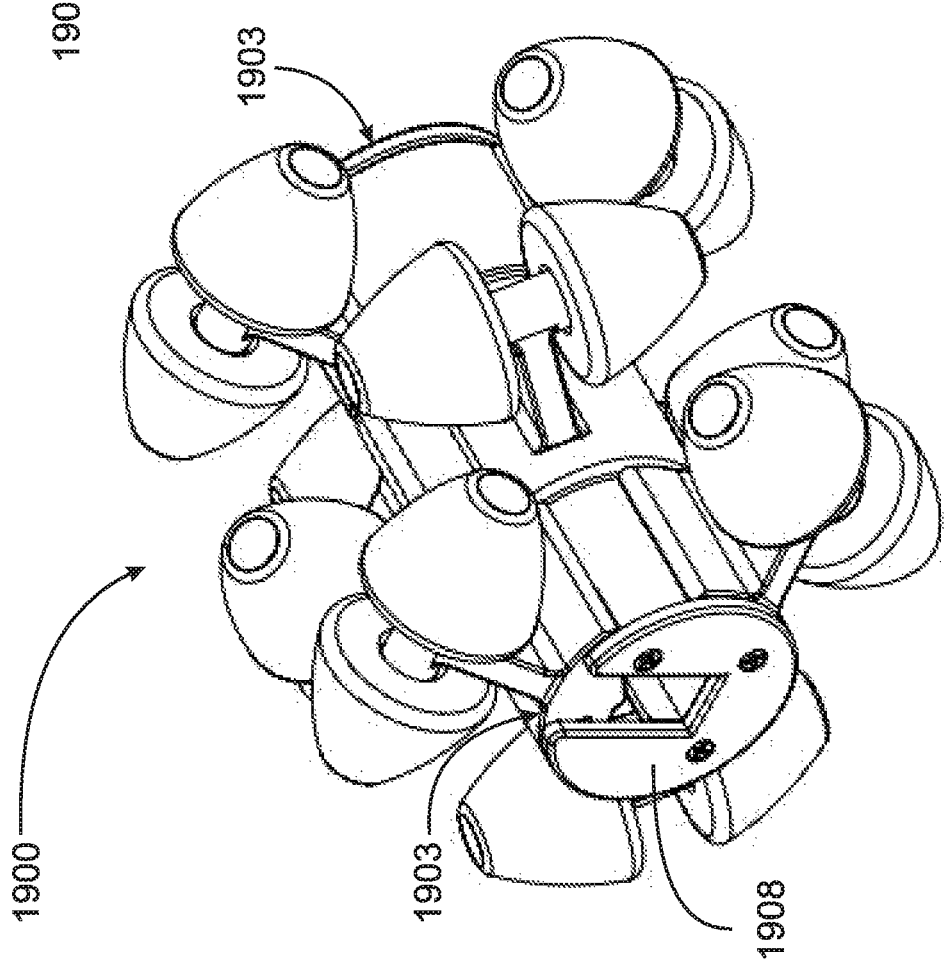

HOSE CARRIER

CROSS-REFERENCE TO RELATED APPLICATIONS

The present application claims priority to a co-pending U.S. application Ser. No. 16/503,919 filed Jul. 5, 2019, which claims priority to Ser. No. 16/013,897, filed Jun. 20, 2018, which claims priority to U.S. application Ser. No. 15/784,115, filed Oct. 14, 2017, which claims priority to provisional patent application, 62/414,350, filed Oct. 28, 2016, and all disclosure of the parent applications is incorporated herein at least by reference.

BACKGROUND OF THE INVENTION

1. Field of the Invention

The present invention is the technical area of mechanical devices for reducing friction, and pertains more particularly to a device for reducing friction and drag for hoses and other conduits, when moving such conduits over supporting surfaces.

2. Description of Related Art

It is well known in the art that there are many pressing needs for moving and relocating hoses and other conduits in many different circumstances. Hoses in gardening and landscaping applications, for example, typically must be connected at a head end to a hose spike, or other source of water, and must be moved to a point of application that may be quite remote from the source. Further, a hose may need to be moved frequently to other points of application, such as to water specific plants. As another example, heavy hoses in firefighting applications need to connect at a source end, and must be moved to point of application for fighting such as brush fires and structure fires. Ability to move and relocate hoses is critical to success in fighting a fire of any sort.

There exist, at the time of filing the present application, no specific solution for the problem of moving hoses and other conduits over ground or structural surfaces other than just picking up the hose, or a portion of the hose and carry it to a different location. Therefore, what is clearly needed is a device or implement that may pair with a hose or conduit in a plurality of positions, providing rollers between the hose or conduit and surfaces upon which the hose may travel.

BRIEF SUMMARY OF THE INVENTION

The present invention in one embodiment provides a roller assembly providing rolling support for a hose or conduit, comprising a center base element implemented in a partly cylindrical shape having a central axis, a middle portion having a first length and a first diameter, opposite end portions extending from the middle portion, each of a second diameter smaller than the first diameter and of a second length, and a channel of a cannel width and a channel depth along full length open to one side of a size to accept a hose the hose or conduit. In this embodiment there are equally spaced outwardly extending projections around the middle portion, the outwardly extending projections having carrier wheels mounted on axels. Two outer base elements each having a cylindrical inner bore of a third diameter of a dimension providing a slip fit over the second diameter of the opposite end portions, the outer base elements each having a length shorter than the length of the end portions, and a side opening of a width equal to a width of the channel along the full length of the center base element, the outer base elements mounted over each of the opposite end portions.

Additional outwardly extending projections are equally spaced around each of the outer base elements, the outwardly extending projections having carrier wheels mounted on axels. Cap disks may be mounted on each end of the center base element, at the end of each opposite end portion, the cap disks having a diameter larger than the second diameter of the end portions, and an opening matching the width and depth of the channel, the cap disks capturing the two outer base elements on the end portions of the center base element, allowing the outer base elements to rotate in a limited arc, around each of the end portions of the center base element. This embodiment provides that the outer base elements may be positioned in rotation to position the side openings in the outer base elements to align with the channel along the length of the center base element, such that the roller assembly may be placed over a hose or conduit, and wherein the outer base elements may be rotated relative to the center base element so the side openings no longer align with the channel, and the hose or conduit is captured in the roller assembly.

An alternative embodiment may comprise spring-loaded balls in axis-oriented bores in structures within each of the outer base elements, the balls tracking on vertical surfaces of the center base element, with a dimple in the vertical surfaces of the center base element in the path of each ball, such that the balls drop in the dimples with the outer base elements oriented to align the side openings with the channel, enabling placement of the roller assembly over the hose or conduit.

An additional embodiment may provide a ramp implemented in a circular arc on a backside of each of the cap disks, and a protruding follower bar on a facing surface of each of the structures within each of the outer base elements, such that as an outer base element is rotated from an open position, the follower bar tracks up the ramp, urging the outer base element toward the middle portion of the center base element, until the outer base element contacts a shoulder of the center base element, constraining the outer base element in the closed position. In this embodiment, as one of the outer base elements rotates relative to the center base element, an edge of the structure within the outer base element contacts and urges against a hose or conduit in the channel.

One embodiment provides that three outwardly extending structures equally spaced around each of the middle portion of the center base element and each of the outer base elements, for a total of nine outwardly extending structures, each outwardly extending structure having two axels with carrier wheels, for a total of eighteen wheels for the roller assembly.

BRIEF DESCRIPTION OF THE SEVERAL VIEWS OF THE DRAWINGS

FIG. 4 is a side elevation view of a single roller of the roller assembly of FIG. 1.

FIG. 5 is a perspective view of an axle rod from the roller assembly of FIG. 1.

FIG. 6A is a face-on view of a retainer element from the roller assembly of FIG. 1.

FIG. 6B is a side view, in section, of the retainer element of FIG. 1.

FIGS. 18A and 18B depict interaction between a connection pin on one base frame element and a cam track on another frame element.

FIG. 26A is a perspective view of a roller assembly in a fully closed state in an embodiment of the invention.

FIG. 26B is a face on view of the roller assembly of FIG. 26A in fully closed state in an embodiment of the invention.

DETAILED DESCRIPTION OF THE INVENTION

Figure 1:
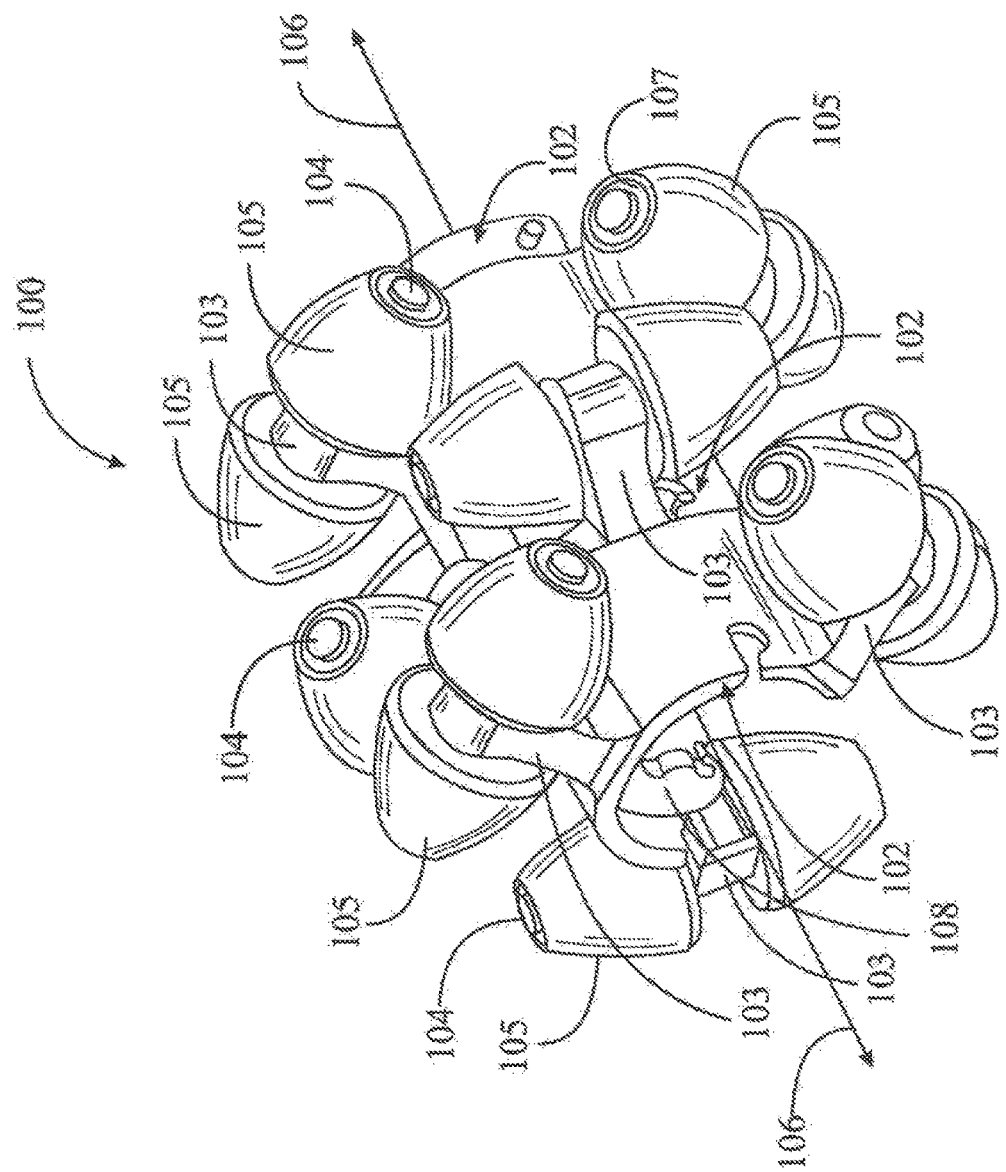
FIG. 1 is a perspective view of a roller assembly providing roller support for a hose or conduit in one embodiment of the invention.

FIG. 1 is a perspective view of a roller assembly 100 providing roller support for a hose or conduit in one embodiment of the invention, a plurality of such assemblies, attached to and spaced apart along a length of a hose or conduit, enabling the hose or conduit to move easily over any supporting surface, or around or over any restraining obstacle. Roller assembly 100 comprises, in this implementation, three connected bases 102, connected in a manner that they may entrain a hose along an axis direction 106, each base 102 having three appendages 103, each appendage 103 providing a bore mounting an axle rod 104, with each axle rod 104 providing a mount for two rollers 105, one on each side of the appendage 103. This arrangement provides a total of eighteen rollers, facing in different directions, such that a plurality of rollers will be in contact with any supporting surface or obstacle at any point in time.

In FIG. 1 not every instance of every element is provided with an element number and a witness line, for to do so would obstruct the understanding of the figure, but the skilled person will realize the repetition of elements.

Figure 2:
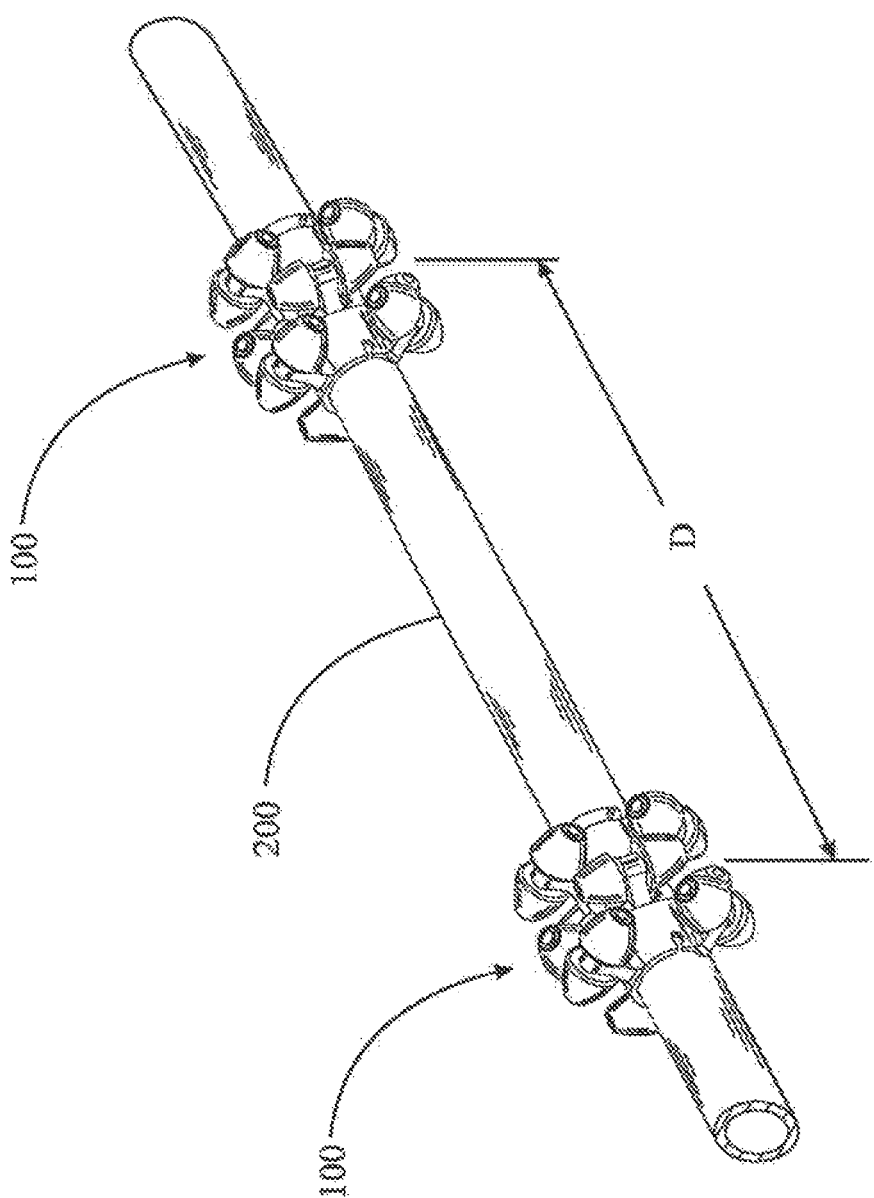
FIG. 2 is a perspective view of two roller assemblies carrying a hose in an embodiment of the invention.

FIG. 2 is an exemplary view of a relatively short section of a hose 200, upon which two roller assemblies 100 have been entrained, spaced apart by an arbitrary distance D along a length of the hose. This arrangement is exemplary of a minimum implementation of the invention. In practice a practical hose in use in an embodiment of the invention might have a considerable plurality of roller assemblies spaced along the length of the hose. The spacing is also a matter of specific use, as the necessary spacing to carry the weight of a hose, and to operate to move the hose in a relatively frictionless manner across supporting surfaces, such as bare earth, grass, gravel, concrete driveways, wooden decks, and the like, may well be a function of the size and weight of the hose, and also nature of the supporting surface and any obstacles to movement of the hose.

The skilled person will realize that weight of the hose is primarily supported in part by each of the roller assemblies, and that the dimensions of elements of the roller assembly is dependent, at least in part, on the size and material of the hose, or other conduit that may be carried by roller elements in embodiments of the invention.

Figure 3:
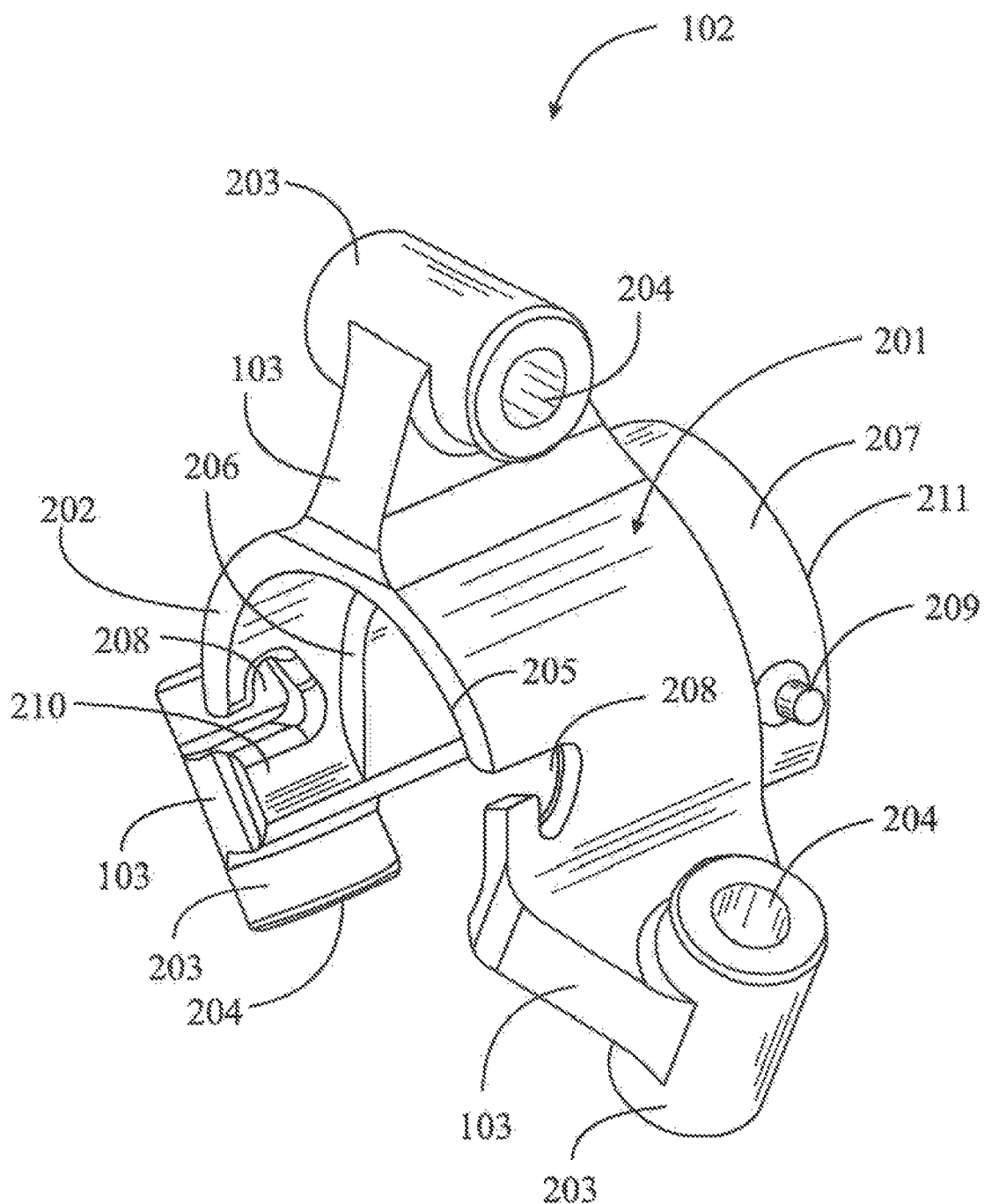
FIG. 3 is a perspective view of a single frame element in the roller assembly of FIG. 1.

FIG. 3 is a perspective view of a single frame element 102 in the roller assembly of FIG. 1. Frame element 102 comprises a partially circular body 201, open on one side, which may be placed over a hose or conduit. Body 201 has three appendages 103, spaced around the circular body in sixty-degree intervals, that each terminate on an axle-mounting element 203 having a bore 204 that has an axis that is orthogonal to a lengthwise axis of the circular body.

Circular body 201 has a female end 202 having an inner diameter 205, and a male end 207 having an outer diameter that provides a slip fit with the inner diameter of the female end, such that two such frame elements may be joined in part by engaging the male end of one into the female end of the other, aligning the two along the lengthwise axis of each. There is a shoulder 206 that serves to limit the degree of engagement of one frame element with a next frame element. Pins 209 are provided on the male end (one visible in FIG. 3), and locking grooves 208 are provided on the female end, through sidewalls of the circular body, such that, as one element is engaged in a next element in line, a rotation serves to lock the one to the other. Assembly of multiple frame elements to one another to provide a roller assembly and engagement of the assembly to a hose or other conduit in the assembly process is described below in enabling detail.

A frame element 102 in one embodiment of the invention is an injection-molded element machine finished in some aspects. For example, it is typical of injection-molded objects like frame element 102, that there will some molding flash to be removed, which may be done manually, or may be done by tumbling a quantity of molded elements in barrels filled with abrasive material. In some cases further tumbling may be implemented to polish the outer surfaces of the molded elements. Finished frame elements may have bores 204 finished to size by a boring tool. In alternative embodiments such frame elements may be die cast, and finished, or may be assembled from other elements.

FIG. 4 is a side elevation view of a single roller 105 of the roller assembly of FIG. 1. There are six of these rollers on a single frame element, and eighteen on a roller assembly combining three frame elements. Roller 105 in one embodiment is approximately cone-shaped, as shown, and may be injection molded, and machine finished. Material in one embodiment may be high-density polymer material, which has a very high coefficient for wear. In other embodiment the rollers may be machined from metal or plastic, and then coated with a high-density polymer to provide the desired wear characteristics.

In one embodiment roller 105 has a through bore of diameter D1, which is controlled to be a slip fit to an axle rod described below. The roller in use must rotate on the axle rod. A counter-bore of diameter D3 from a larger end is of a dimension to fit over the outside diameter of mounting element 203 at the end of each of appendages 103 of frame element 102. Another counter-bore at the smaller end of the roller, of diameter D2, is provided to accommodate a cinching collar described below, to hold the roller on the axle rod.

FIG. 5 is a perspective view of axle rod 104 of FIG. 1, which is of a length d2 sufficient to pass through bore 204 of mounting element 203 at the end of appendage 103, to engage two rollers 105, one on each side of each mounting element at the end of each appendage 103 of a frame element. The rollers are provided to rotate mainly on axle rod 104 by bore diameter D1. The axle rods in one embodiment are surface-hardened steel, and may be ground to final diameter.

FIG. 6A is a face-on view of a single cinching collar 107, and FIG. 6B is a side view of the cinching collar. This collar, in one embodiment is a commercially available element known in the art for performing the function of retaining elements on a shaft in assembly. The inside diameter D1 is actually a bit smaller than diameter D1 of the axle rod, so the cinching collar may be pressed onto the axle rod in assembly and will hold the rollers in place. The outside diameter D2 of the cinching collar fits into the counter-bore D2 of the wheel in assembly.

Figure 7:
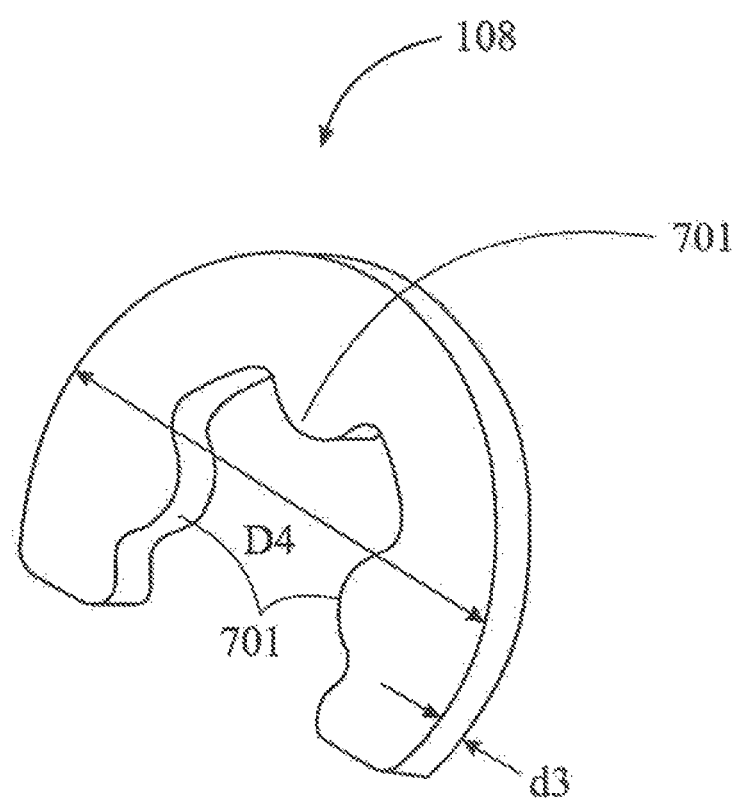
FIG. 7 is a perspective view of an assembly gasket from the roller assembly of FIG. 1.

FIG. 7 is a perspective view of an assembly gasket 108 from the roller assembly of FIG. 1. Referring now to FIG. 3, frame element 102 has shoulder 206 as a limit in female end 202. In assembly of one frame element to another gasket 108 is placed against shoulder 206, such that an end of the male end of another frame element will contact this gasket in assembly. Thickness d3 of gasket 108 is provided such that the gasket is compressed somewhat to align posts 209 with locking grooves 208, so as the frame elements are rotated in locking, the gasket proves a force against the locking grooves, that keeps the frame elements locked together. Gasket 108 has additional features 701 that engage a hose or conduit in a manner that the hose or conduit are gripped securely, even though there may be differences in diameter between individual hoses or conduits.

Figure 8:
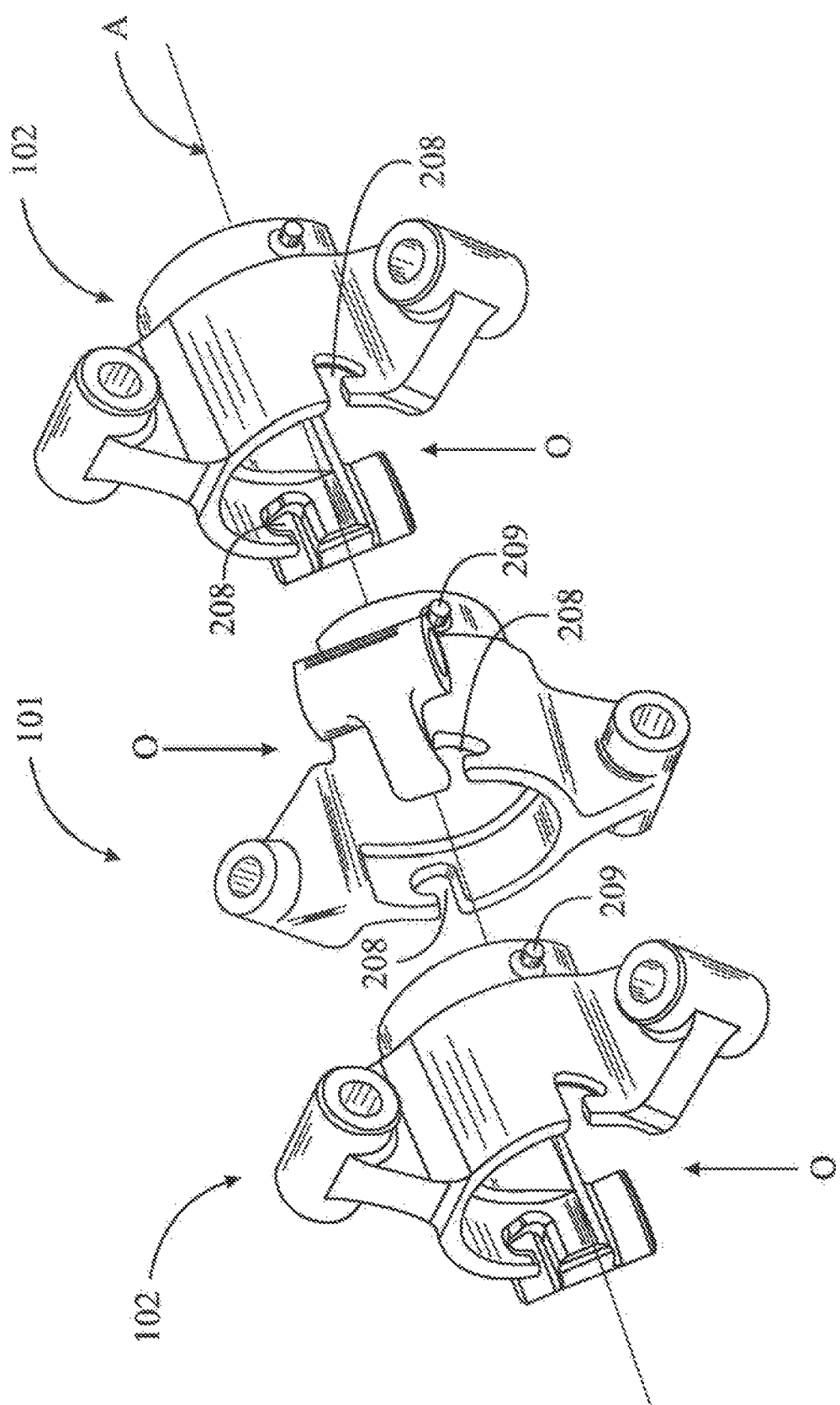
FIG. 8 is a perspective view of three frame elements aligned for assembly in an embodiment of the invention.

FIG. 8 is a perspective view of three frame elements 102 aligned for assembly to a hose or a conduit in an embodiment of the invention. The frame elements are identical. The only difference is that the frame elements on each end of the row of three are open from below, and the middle frame element is open from the top. The middle frame element is simply rotated 180 degrees around axis A, which is the axis of a hose or conduit to which the three frame elements may be engaged as assembles into a roller assembly, as shown in FIG. 1. Axle rods and rollers are not shown in FIG. 8, so the frame elements may better illustrate the relationship between the elements.

To engage one roller assembly 100 at one position along a hose or conduit, as may be seen in FIG. 2, a user will place one frame element 102, complete with axle rods and rollers, over the hose or conduit. This first frame element (furthest left in FIG. 8) will not securely engage the hose or conduit. The user will then place a second frame element, the middle element in FIG. 8, in place over the hose or conduit, rotated 180 degrees around axis A, next to the first element placed over the hose. A gasket 108 is placed in the second (middle) frame element, against shoulder 206 (see FIG. 3). The two frame elements are brought together along axis A, with the male end of the second frame element engaging the female end of the first frame element. Pins 209 of the first frame element engage the locking grooves 208 of the second frame element, requiring some force against gasket 108 to twist and engage, and when released, the gasket keeps the pins and locking grooves engaged.

Referring now to FIG. 7, illustrating gasket 108, projections 701 serve a function of compressing against the hose or conduit that is the object of the roller assembly, and enable roller assemblies of one size to be used with hoses and conduits of a variation in diameter.

It will be apparent to the skilled person that a roller assembly comprising two frame elements with axels and rollers will be relatively stable on a hose or conduit, and could be used to practice the invention, but that the roller assembly with three frame elements is more stable, and may be preferred.

In the embodiments thus far described, three frame elements, each with a side opening, are placed over a hose or conduit, and engaged with one another in a manner that the side openings are not aligned, which serves to engage the assembled frame elements to the hose or conduit. In an alternative embodiment, illustrated in perspective view in FIG. 9, a single frame element comprising two halves engaged by a hinge mechanism is used, such that the frame element may be unlatched and opened by rotating the parts relative to one another around the hinge element, than placed over the hose or conduit, closed and latched.

In the embodiment illustrated in FIG. 9 the frame is a single cylindrical unit 901, comprising two half-cylinder mirror image elements 902 and 903, separated along lines 910, joined in a manner described below such that the separate elements may be opened to join the roller assembly to a hose or a conduit, and then closed and latched. In this embodiment the appendages 103 and rollers 105 are arranged in the relationship shown and described above for the final assembly of the three frame elements as shown prior to FIG. 9, and the cylinder of the frame is split along lines that pass between the appendages for the rollers. The position of the split lines in FIG. 9 is exemplary, and not limiting, as the split lanes could be elsewhere, and not necessarily splitting the cylinder into equal halves.

Elements 904 are substantially half cylinder layers of foam rubber, or equivalent material, glued to the inside diameter of the halves on the cylindrical frame. These elements allow the roller assembly to be effectively joined to hoses or conduits of somewhat different diameters.

Figure 9:
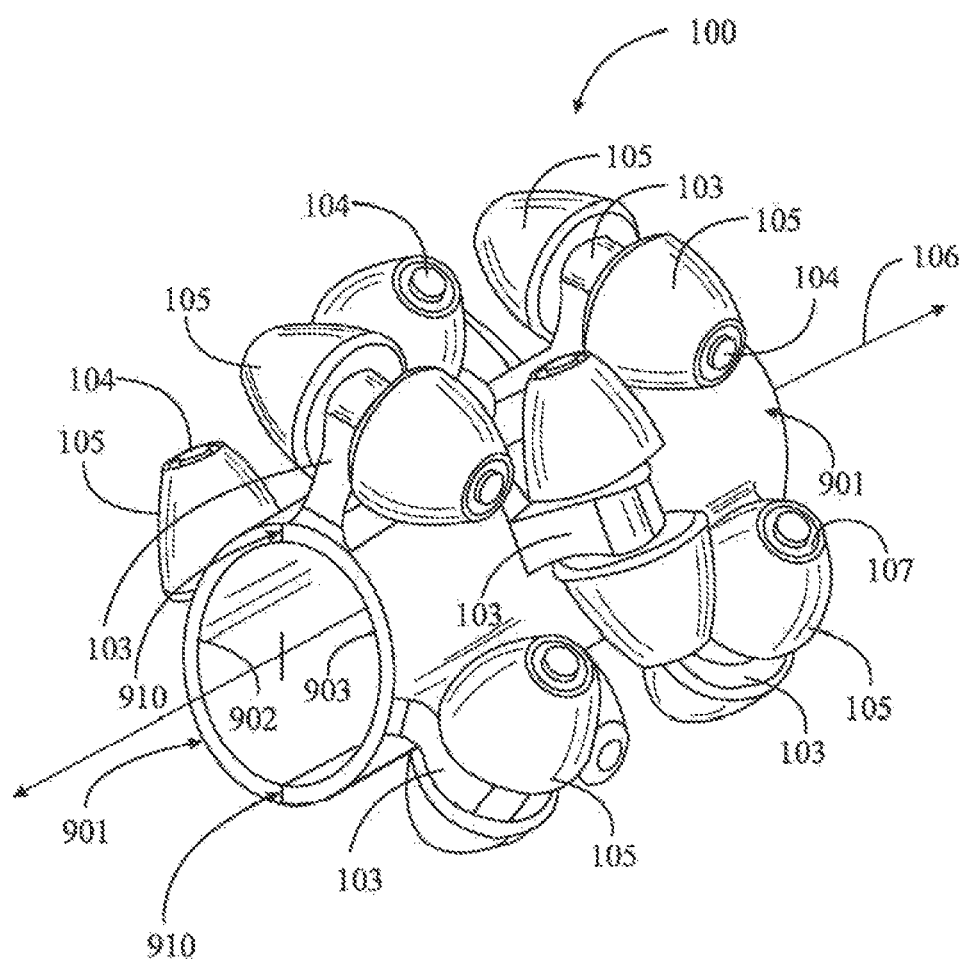
FIG. 9 is a perspective view of a roller assembly in another embodiment of the invention.
Figure 10:
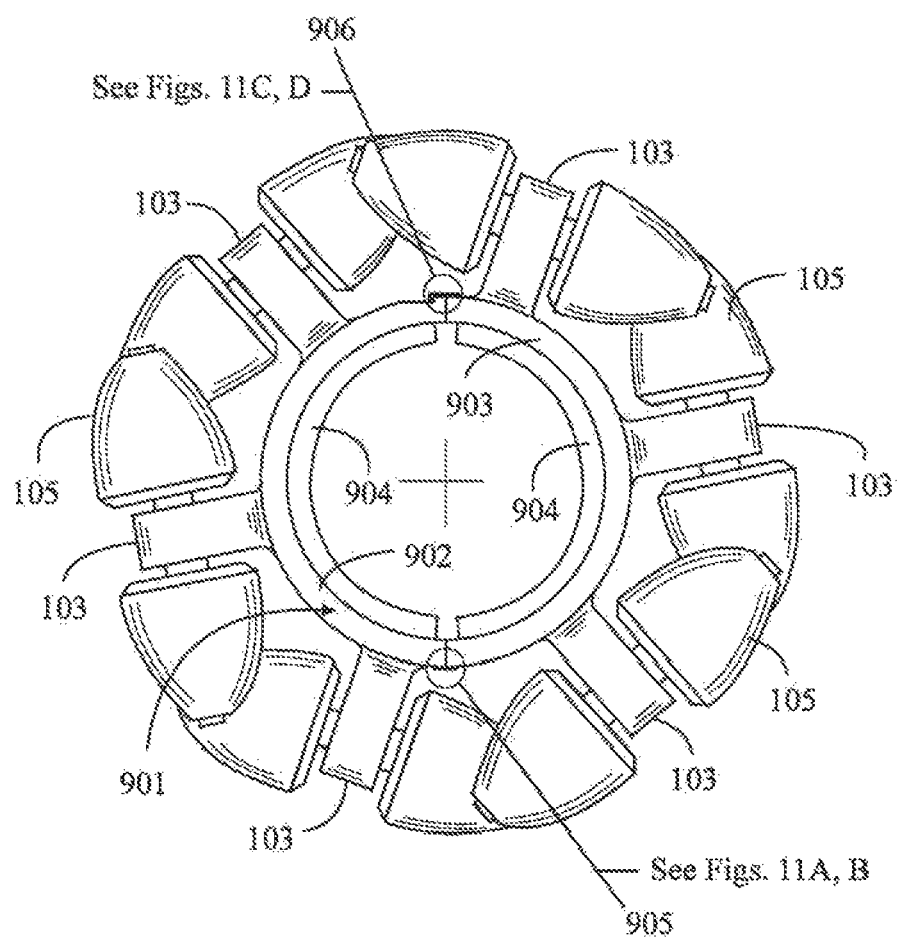
FIG. 10 is a straight-on end view of the roller assembly of FIG. 9.

FIG. 10 is a straight-on end view of the roller assembly of FIG. 9, showing an exemplary arrangement of a hinge 905 and a latch 906. In one embodiment the hinge is accomplished by a strip of fabric or thin, flexible plastic that is heat welded or glued across the split line. As the two halves are pivoted relative to one another, the fabric allows the frame elements to pivot at the line where corners of the elements meet. In other embodiments physical and mechanical hinges of various sorts may be used. Hinge elements may be molded into the fame elements as well.

Figure 11A:
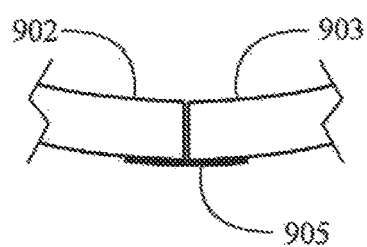
FIGS. 11A, 11B, 11C, and 11D illustrate hinge and fastening element in an embodiment of the invention.
Figure 11B:
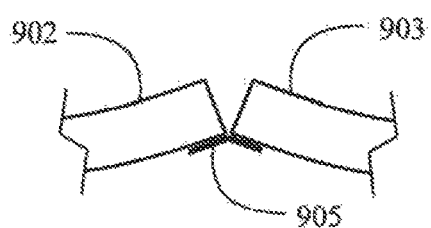

FIGS. 11A, B, C, and D illustrate hinge and fastening element in an embodiment of the invention. FIG. 11 is a somewhat magnified view of the two frame elements and hinge element 905, with the frame closed. FIG. 11B shows the frame elements partly open such the thin strip hinge element 905 acts to hold the elements together as the assembly is opened and closed.

Figure 11C:
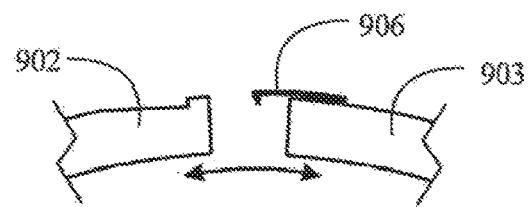

FIG. 11C shows a latch element 906 glued or heat welded to one of the frame elements, proximate the upper split line. Latch element 906 has a flexible arm with an angled, cantilevered end which latches to a groove machined into the opposite frame element as the two halves are rotated around the hinge to close the assembly, shown with the assembly open in FIG. 11C.

Figure 11D:
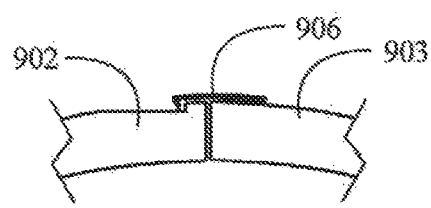

FIG. 11D shows the assembly with the two frame elements closed and latched. The frame elements may be implemented at specific places along a length of the cylindrical assembly.

Figure 12A:
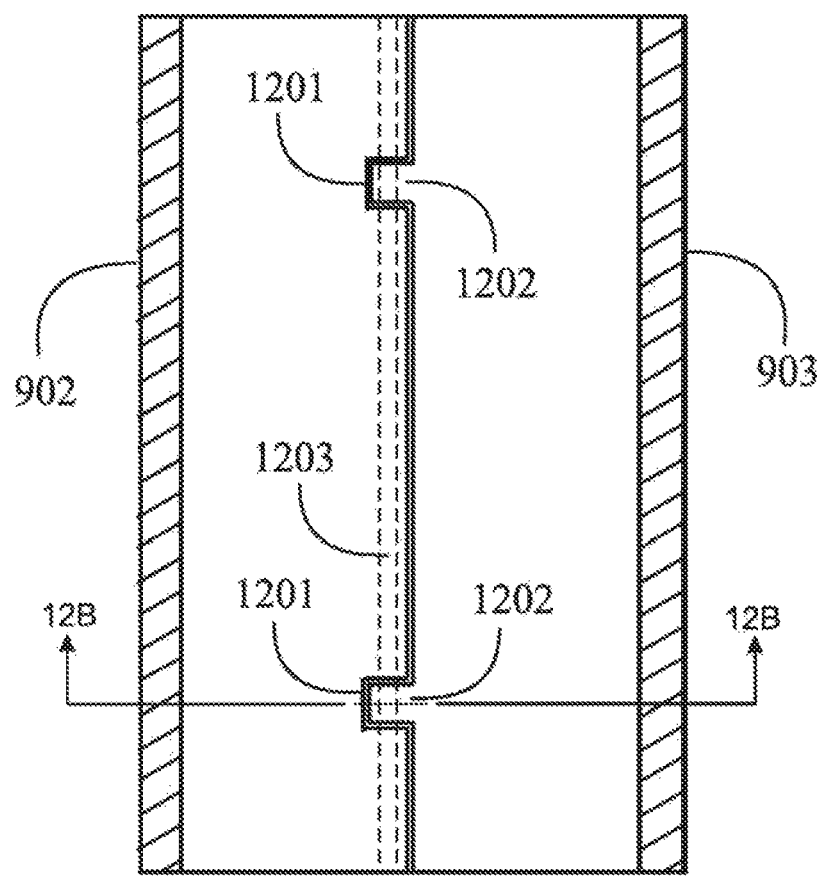
FIG. 12A is a section view of cylinder 901 illustrating hinges in an alternative embodiment.
Figure 12B:
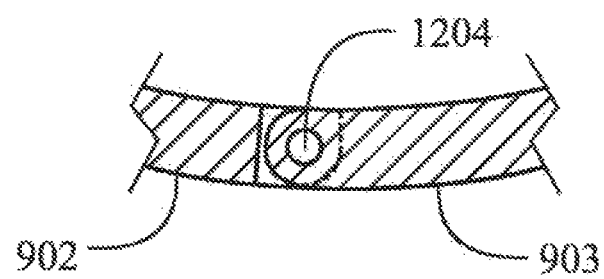
FIG. 12B is a partial section illustrating one of the hinges of FIG. 12A.

FIGS. 12A and 12B illustrate an alternative hinge mechanism. FIG. 12A is a section view of cylinder 901 illustrating two hinges implemented between half-cylinders 902 and 903 that comprise cylinder 901. In this implementation half-cylinder 902 has two rectangular notches 1201, and half-cylinder 903 has two rectangular appendages 1202, which are sized to fit into notches 1201 with clearance for rotation. A through bore 1203 is provided lengthwise to pass through portions of half-cylinder 902 and both appendages 1202. FIG. 12B is a partial section taken along section line 12B-12B of FIG. 12A, through half-cylinders 902 and 903, including one of appendages 1202. Pin 1204 is installed through bore 1203 to join the half-cylinders and complete the hinge mechanism. Bores through appendages 1202 are a few thousandths of an inch greater in diameter than through the body of half-cylinder 902, so the half-cylinders may rotate relative to one another, to open the body of the roller assembly.

The arrangement shown in FIGS. 12A and 12B, and described above, is exemplary. There may in other embodiments be more than the two hinge positions shown, and dimensions may vary. Further, in some embodiments separate pins may be installed for each hinge. The skilled person will understand that the notches and appendages may be implemented at positions along the length where there will be no interference with the appendages for roller assemblies.

Figure 13A:
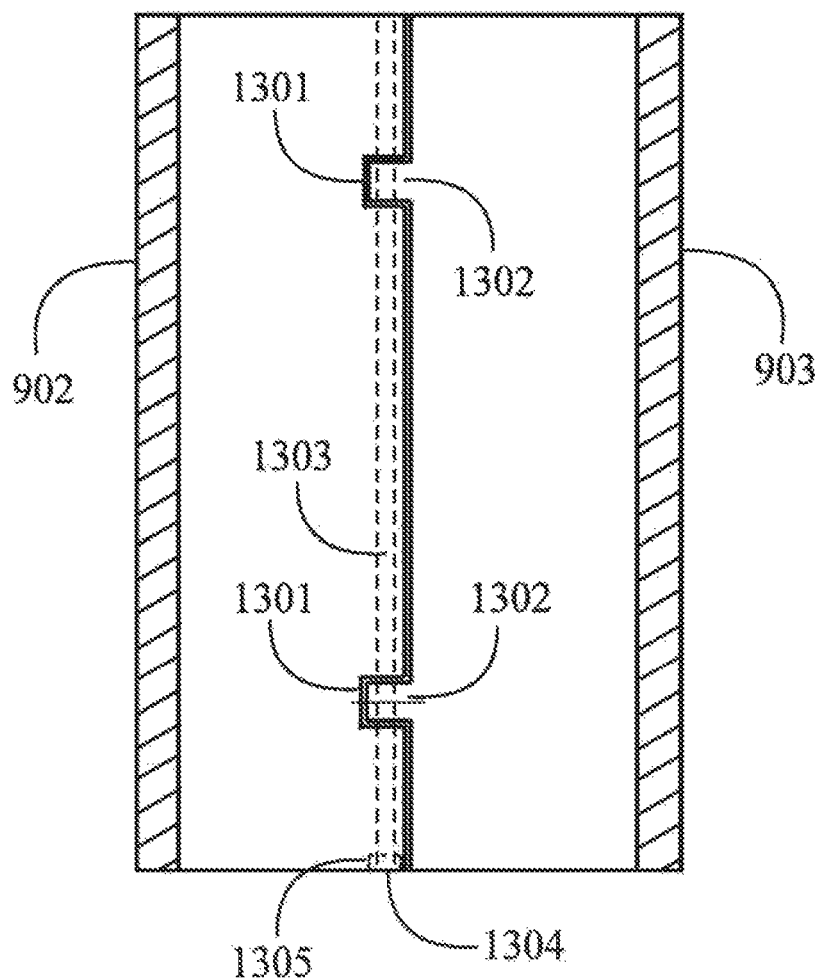
FIG. 13A is a plan view of cylinder 901 illustrating a closing mechanism in one embodiment.

FIG. 13A is a plain view of cylinder 901 illustrating a closing mechanism in one embodiment. In this implementation~the edges of half-cylinders 902 and 903 where the edges meet to close, are formed just as they are for the edges where the hinge mechanism is implemented. See notch elements 1201 and appendages 1202 in FIG. 12A, and notch elements 1301 and appendages 1302 in FIG. 13A. A single difference is in the pin 1204 for the hinge mechanism, as opposed to pin 1304 for the closing mechanism. Pin 1304, in one embodiment, passes through bore 1303 for the full length of the cylinder assembly, but has a short-threaded portion on one end that engages a female-threaded counter-bore 1305 and a screwdriver slot 1306 on the threaded end, for tightening the threaded pin in the threaded counter-bore. It should also be understood that the foam rubber elements 904, with half-cylinders closed, will exert outward pressure that will tend to aid the closure mechanism.

Figure 13B:
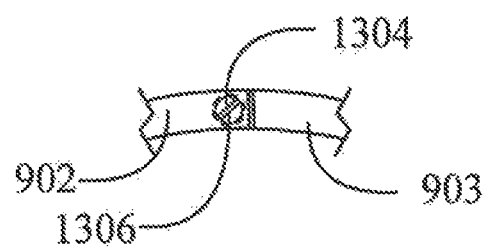
FIG. 13B is a partial end view of the closing mechanism of FIG. 13A.

As is true of the hinge mechanism described with reference to FIGS. 12A and 12B, the closing mechanism described with reference to FIGS. 13A and 13B is exemplary only. The two notched and appendage shown could in one embodiment be one each, and in other embodiments may be more than two. There may be a threaded counter-bore on each end of bore 1303, and two pins with threaded portions, one engaging from each end. Dimensions may vary as well in different embodiments.

Further to the above descriptions of hinge and closing mechanisms, the skilled person will understand that these are just examples of a wide variety of ways that hinges and closures may be implemented.

In another aspect of the present invention a hose carrier assembly is provided that is similar to that illustrated by FIG. 1, and accomplishes the same purposes, but that is implemented substantially differently. The assembly of FIG. 1 is implemented by assembling three identical frame elements, one as is shown in FIG. 3, and the assembly made as indicated in FIG. 8. In FIG. 8 it may be seen that one frame element 102, with the opening "O" facing upward, serves as a central frame element, and two additional frame elements 102 are assembled to the central frame element on each side, each with the opening "O" facing downward. The skilled artisan will understand that the facing up and facing down is arbitrary and may well be reversed.

Figure 14A:
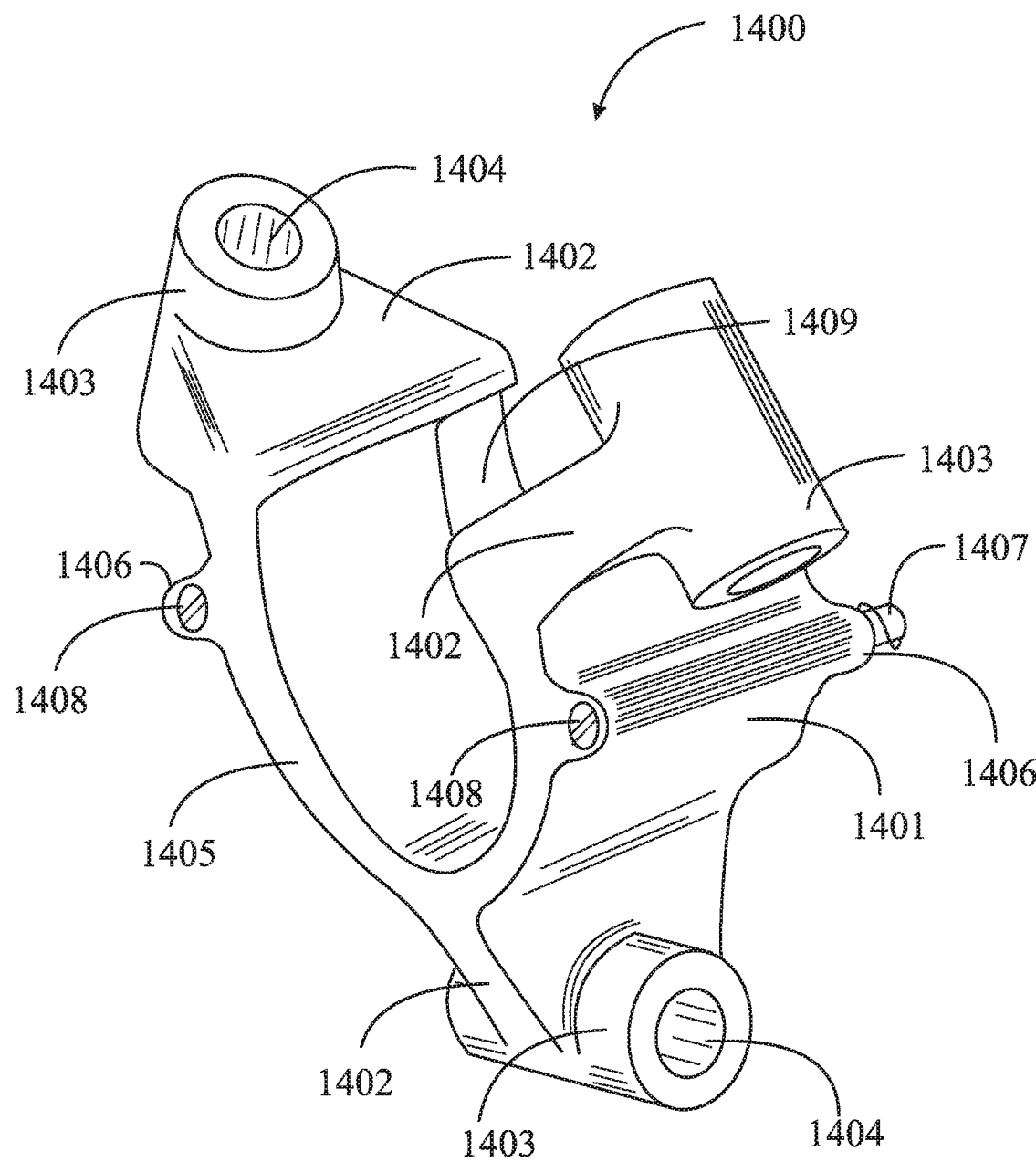
FIG. 14A is a perspective view of a frame element in an alternative embodiment of the invention.

In an alternative embodiment there are three frame elements assembled side by side, as indicated in FIG. 8, but the bases are not identical. FIG. 14A illustrates an end base frame element 1400 which has one female end, with bore 1409, and one blank end 1405, neither male or female. The counter bore 1409 is to receive a male end of a central base described more fully below.

Figure 14B:
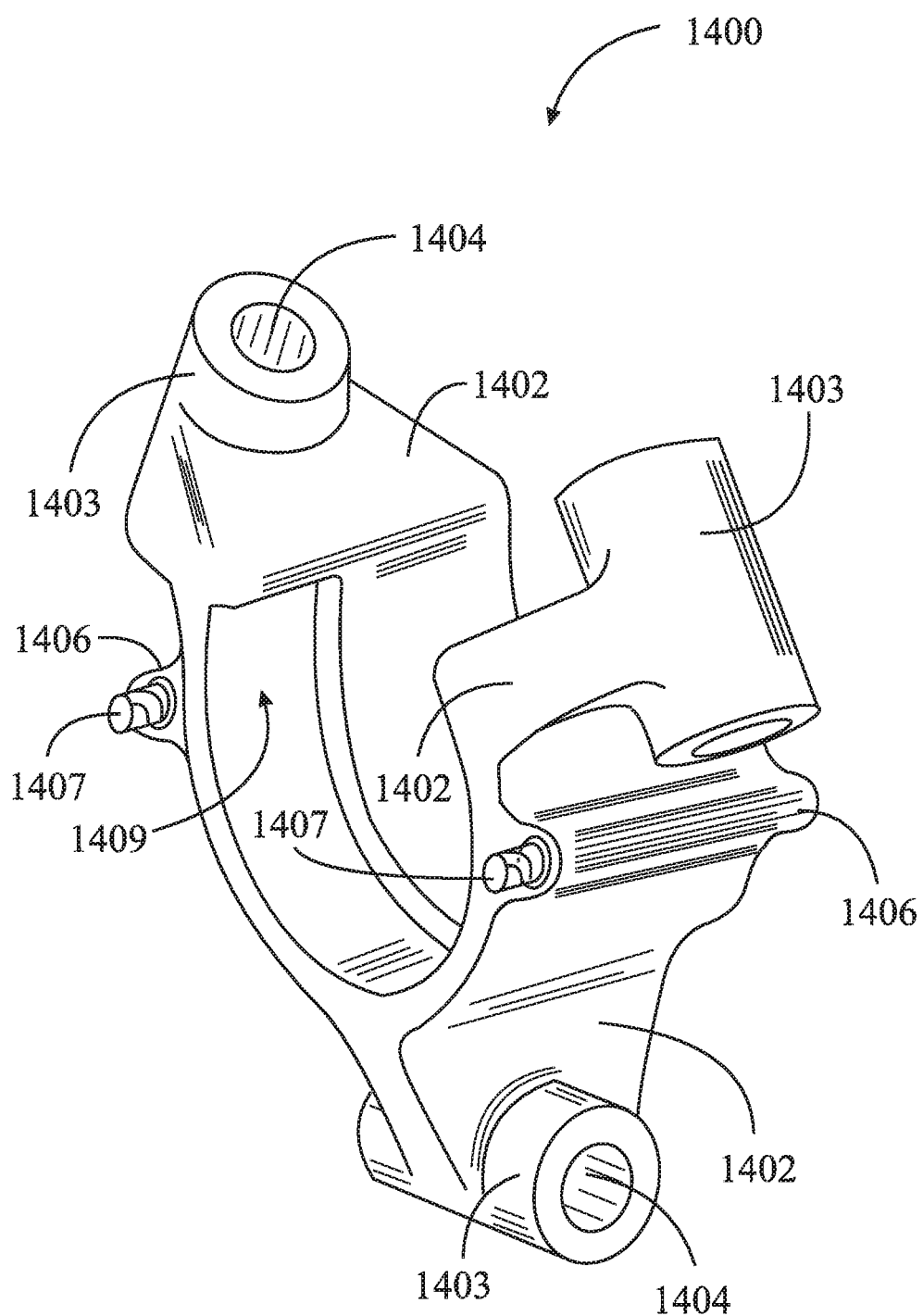
FIG. 14B is a perspective view of the frame element of FIG. 14A from an opposite viewpoint.

FIG. 14B is a view of end base frame element 1400 of FIG. 14A, as seen from an opposite viewpoint. It is the same frame element 1400 rotated around a vertical axis by 180 degrees. There are three appendages 1402 just as in the base element 102 of FIG. 3, each having a mounting element 1403 with a bore 1404 for mounting an axle for a wheel, just as described above for other embodiments.

A significant difference in this alternative embodiment is in the way the base frame elements are held together in assembly, and disassembled. In this alternative embodiment base frame element 1400 has projections 1406 parallel to the longitudinal axis of the frame element, with through holes, also parallel to the axis. There are two such projections with through holes, implemented on sides of the body 1401 of the base, at approximately 180 degrees separation. Each through hole carries a connector post 1407 that has a spiral fluted end, and a slot 1408 at the opposite end, the slot useful for turning the connector post, using a coin or other implement. In other embodiments the connector post may have turnkey panel for a user to grasp to turn the connector post.

Figure 15:
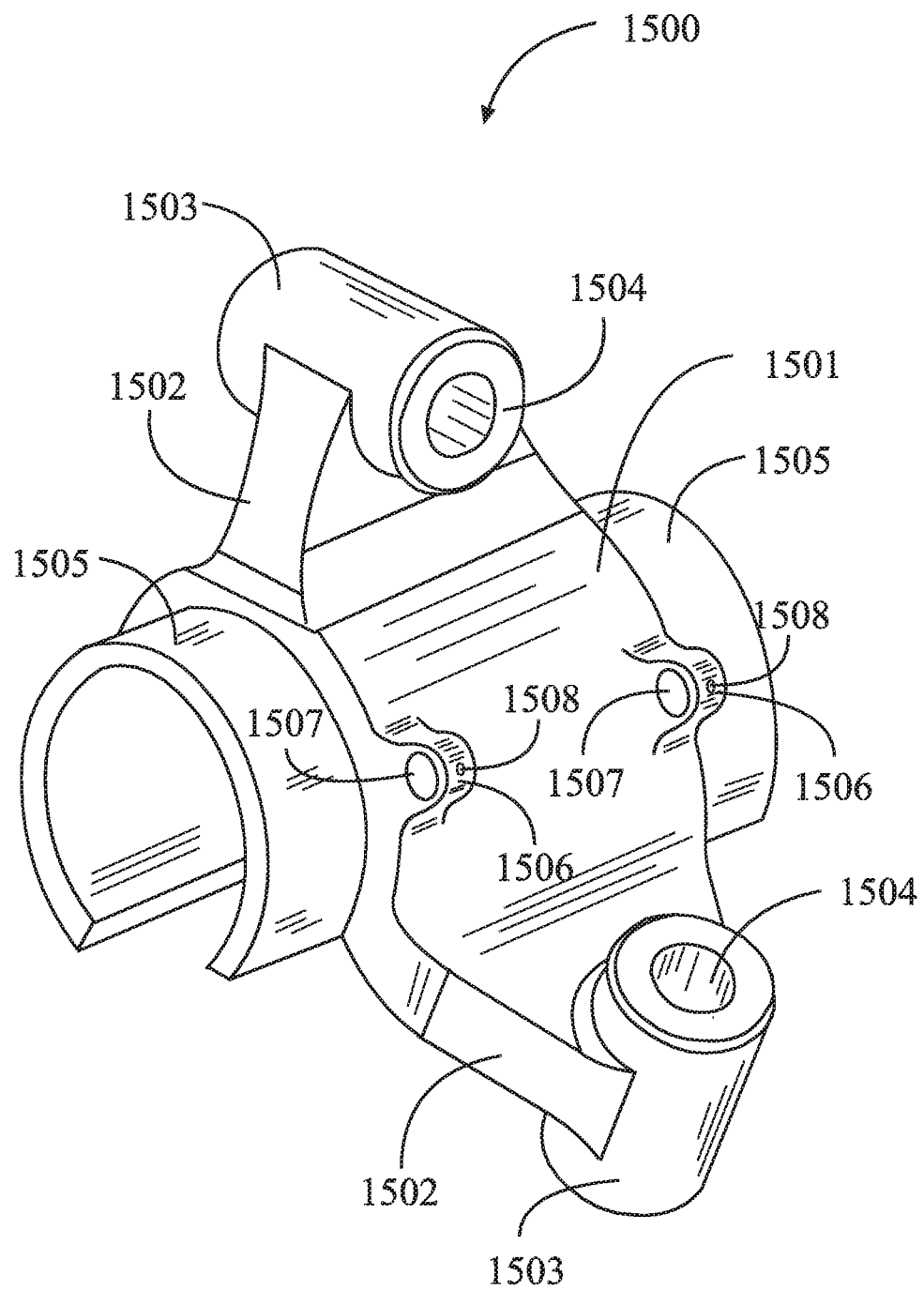
FIG. 15 is a perspective view of another frame element in an alternative embodiment of the invention.

FIG. 15 is a perspective view of a frame element 1500, having a body 1501 with two opposite male ends 1505. Frame element 1500 is a single central element used with two elements 1400 to assemble a roller assembly. Frame element 1500, like frame element 1400 and earlier frame elements described, has appendages 1502, mounting elements 1503 and axis bores 1504. There are, in addition, four short projections 1506 with holes 1507 in the direction of the axis of the frame element, having internally imposed flutes matching the flutes of posts 1407. The external flutes of posts 1407 and internal flutes of holes 1507 are in essence very course threads with a very long pitch. The external flutes of posts 1407 engage the internal flutes of holes 1507, and turning the post draws the frame elements together with a single turn of the posts. In an alternative embodiment, external and internal flutes are not incorporated.

In this alternative embodiment there are still three frame elements to make one roller assembly to carry a hose or conduit, but the frame elements are the central element 1500 with two elements 1400 assembled to each end of the central element. This order and arrangement is illustrated in FIG. 16.

Figure 16:
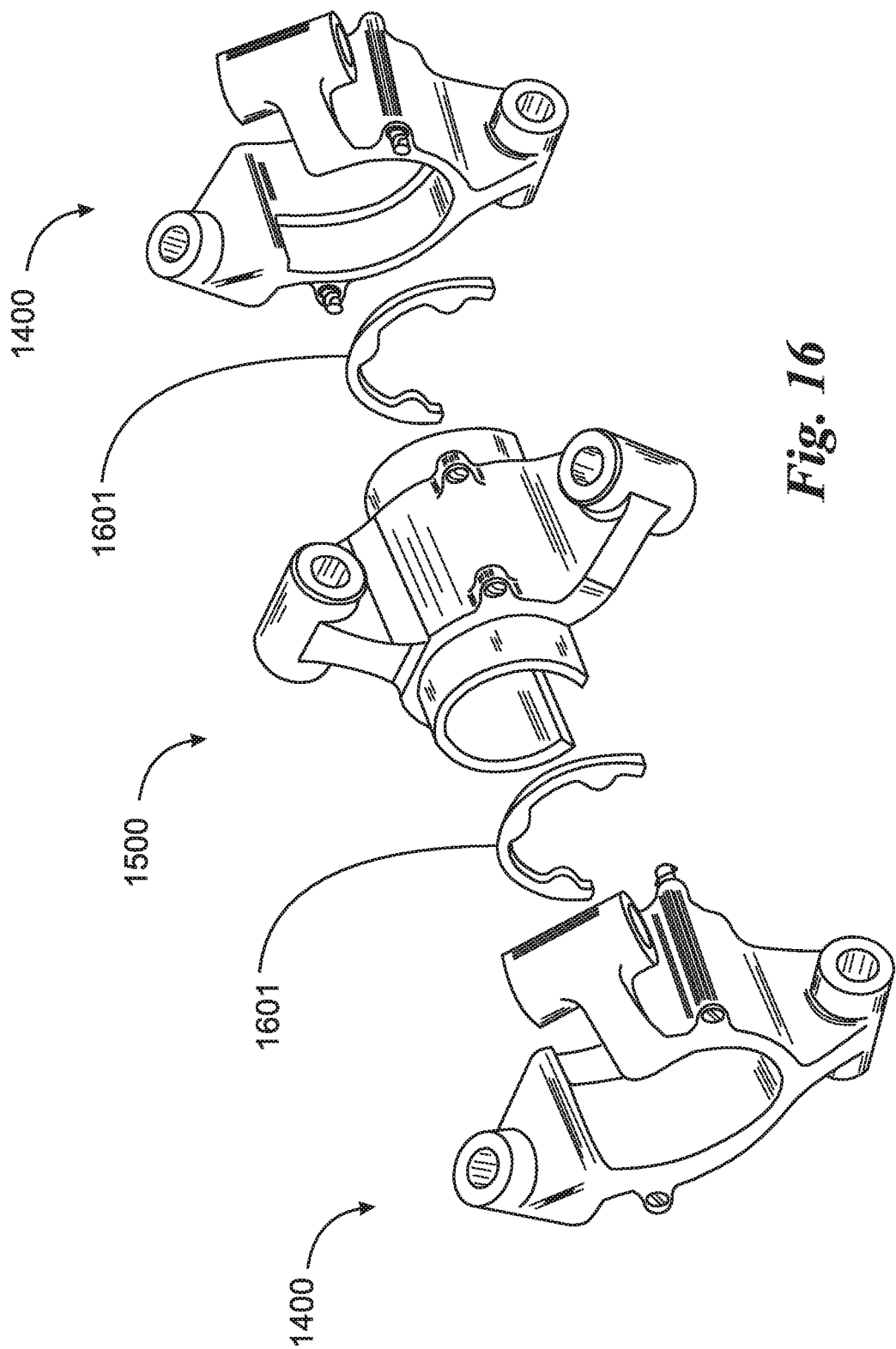
FIG. 16 is an exploded view of frame elements in an order for assembly into a roller assembly.

FIG. 16 is an exploded view of the assembly of one central frame element 1500 with two end frame elements 1400 to provide a carrier assembly analogous to assembly 100 of FIG. 1. The frame elements are shown without axles and wheels mounted to avoid unnecessary confusion in detail. The center element is frame element 1500 as seen in FIG. 15. In this exploded view frame element 1500 is shown with the opening facing downward rather than upward, and frame elements 1400 are shown with the opening facing upward. The skilled person will recognize that this is arbitrary and all three might be flipped over. In FIG. 16 gaskets 1601, analogous to gaskets 108, are shown between the base elements. When the base elements are brought together, with extensions 1505 engaging bores 1409 of the two identical end elements, posts 1407 may engage holes 1507, and the posts rotated may bring the frame elements together, and gaskets 1601 will be compressed, providing an outward force between the frame elements, which serves to lock the elements together, and also to spring them apart when the posts are turned in reverse to disassemble.

Figure 17A:
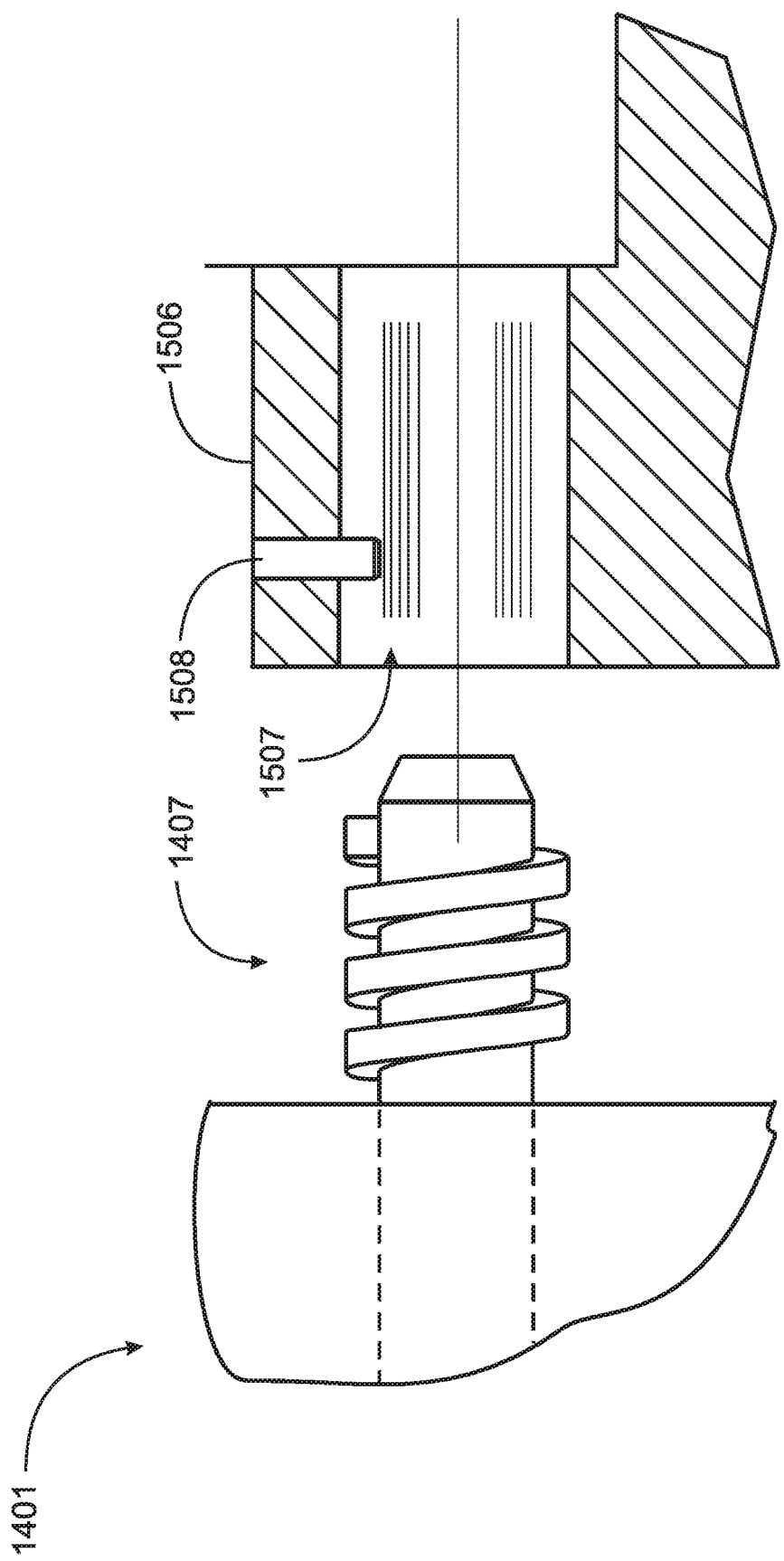
FIGS. 17A and 17B are a close up view of interaction between a post on the frame element and an associated hole.

FIG. 17A is a magnified detail of the fluted end 1407 of one of the connector posts, in line with hole 1507 in one of the projections 1506, which has a pin 1508 through the wall extending part way into hole 1507. Pin 1508 serves as a cam follower to the flutes of the post, which provide a cam action when engaged.

Figure 17B:
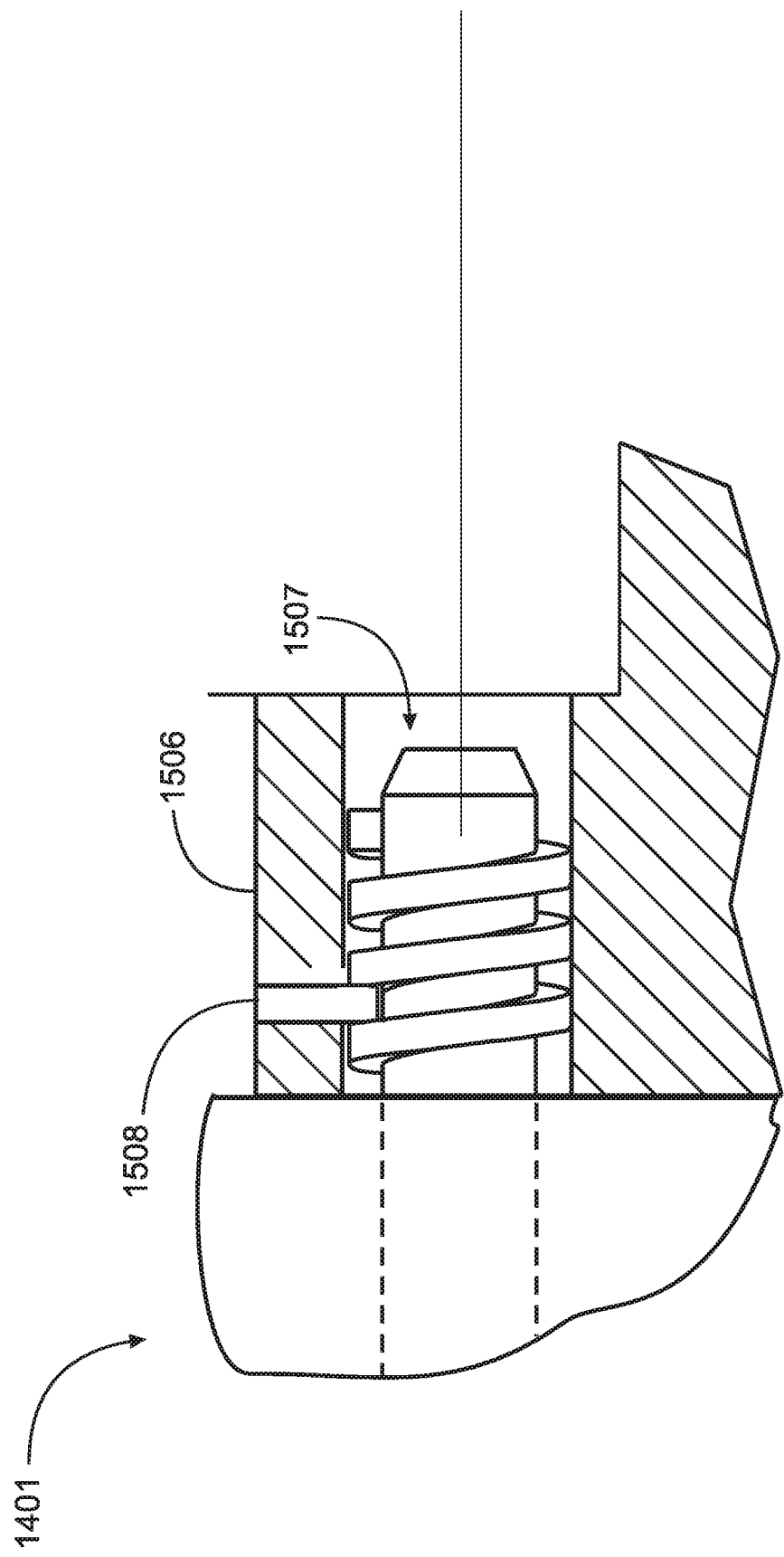

FIG. 17B is similar to 17A, but the post has been inserted into hole 1507, the post turned to engage cam follower pin 1508, and projection 1506 has been drawn into contact with body 1401 of the outer base element. In one embodiment the cam spiral is provided in a way that, when fully engaged there is a flat portion of the spiral track.

In one embodiment the pitch of the spiral track is substantially longer, which reduces the revolution of the post necessary to draw the bases together, for example, the action may be completed to a locked position in one-half turn of the post.

In yet another embodiment of the invention a different cam action mechanism may be implemented, wherein the center base element may be drawn into and locked to the outer base elements by a relatively short rotation of the base elements about the longitudinal axis.

FIGS. 18A and B illustrate a cam element 1801 having a cam track 1803 that may be implemented at four places on the center base element 1500, at the same places that projections 1506 are shown in FIG. 15. Only one position is shown, as the same cam element is implemented at the other three positions. Cam follower pins 1802 are positioned near the inner edge of each of outer bases 1400, at about 180 degrees apart, where they may engage with track 1802 in cam element 1800. The position of cam follower pins 1802 is about the position of the fluted ends of posts 1407 are shown.

Referring to FIG. 18A, with an outer base 1400 positioned as shown, a distance D from inner base 1500, with cam follower pin 1802 near the entrance to track 103 of element 1802, the user may rotate the inner base and the outer base an indicated by the vertical arrows. Pin 1802 (at both positions) enters track 1803, and further relative rotation brings the bases together as shown in FIG. 18B. The same operation engaging the other end of the inner base with the other outer base adds the third base to the assembly. The bases may be disconnected by reverse rotation.

Cam elements 1801 may be added to the inner base 1500 by conventional fasteners, may be molded on in manufacture, or may be heat welded to the body of the inner base.

Figure 19:
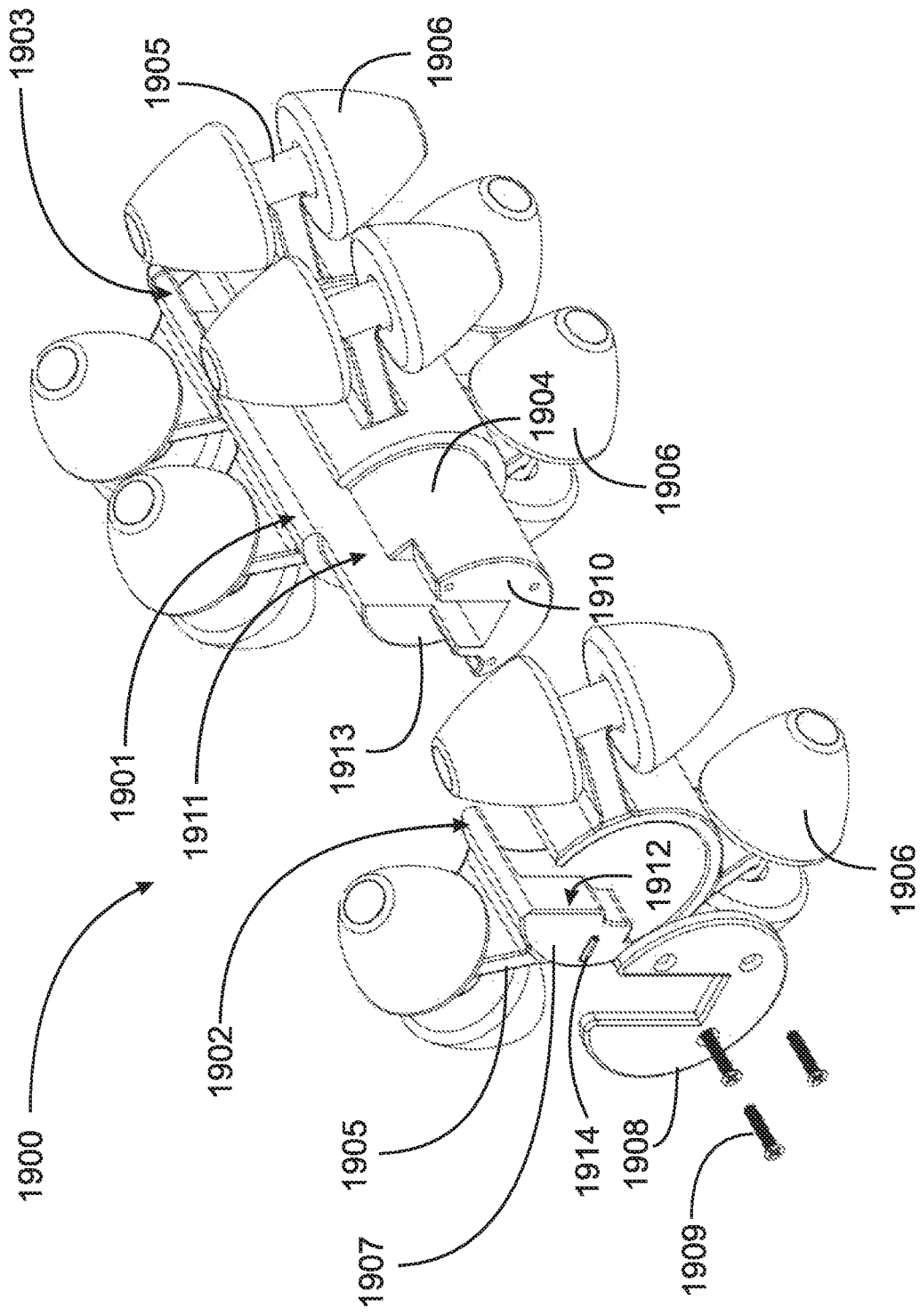
FIG. 19 is a perspective view of a roller assembly in yet another embodiment of the invention, in a partially exploded view, in an embodiment of the invention.

In yet another aspect of the invention a roller assembly for supporting a hose or conduit is provided in which the engagement and operation of the separate bases is substantially different than so far described above. FIG. 19 is a perspective view of a roller assembly 1900 in partially exploded view. There are, as in previous versions, three parts to the roller assembly, being, in this embodiment, a center base 1901, a first outer base 1902 and a second outer base 1903. In FIG. 19 first outer base 1902 is shown separated from the center base 1901, and second outer base 1903 is shown assembled to the center base 1901 on the opposite side of the center base 1901 from the first outer base 1902.

All three bases have each three appendages 1905 (shown in later drawings), which are analogous to appendages 103 described above, each appendage 1905 providing a bore mounting an axle rod, with each axle rod providing a mount for two rollers 1906, one on each side of the appendage. The rollers and axel rods may be the same as rollers 105 and axel rods 106 described above for other embodiments of the invention. This arrangement provides a total of eighteen rollers 1906, facing in different directions, such that a plurality of rollers 1906 will be in contact with any supporting surface or obstacle at any point in time, just as described above for other embodiment of the invention.

A significant difference in roller assembly 1900 as compared to previously described roller assemblies is in the construction of both the center base 1901 and the outer bases 1902 and 1903 as to how the bases join and operate. Center base 1901 has a projection 1904 extending to each side of the center base 1901. This projection 1904 has a substantially cylindrical outer shape, having an outside diameter, an inner surface 1913, and ends at a planar end 1910. Outer bases 1902 and 1903 have an inside diameter that provides a slip fit over projections 1904 of the center base 1901.

Outer base 1903, shown assembled to center base 1901 in FIG. 19 is physically the same as outer base 1902, and but is positioned so the inside diameter of outer base 1903 may be assembled over the outside diameter of another projection 1904 of center base 1901. Each outer base 1902 and 1903 has an internal structure 1912 that interacts with structure of the center base 1901 in operation, as described in further detail below. Structure 1912 has an end surface 1907 orthogonal to the axis.

The length of each outer base 1902 and 1903 is substantially the same as the axial length of projections 1904, so when the outer bases 1902 and 1903 are assembled to the center base 1901, the planar end 1910 of each projection 1904 is coplanar with the planar surface 1907 of each outer base 1902 and 1903. A follower bar 1914 protrudes from each planar surface 1907.

A cap 1908 is provided that may be fastened to planar end 1910 by screw fasteners 1909 inserted into through-holes engaging corresponding threaded holes in surface 1910. The outer diameter of cap 1908 is the outer diameter outer base 1902 and 1903, such that, with the outer base engaged to projection 1904, cap 1908 retains the outer base in a manner that the outer base 1902 may be rotated around the central axis relative to the center base 1901, for a limited arc.

Figure 25:
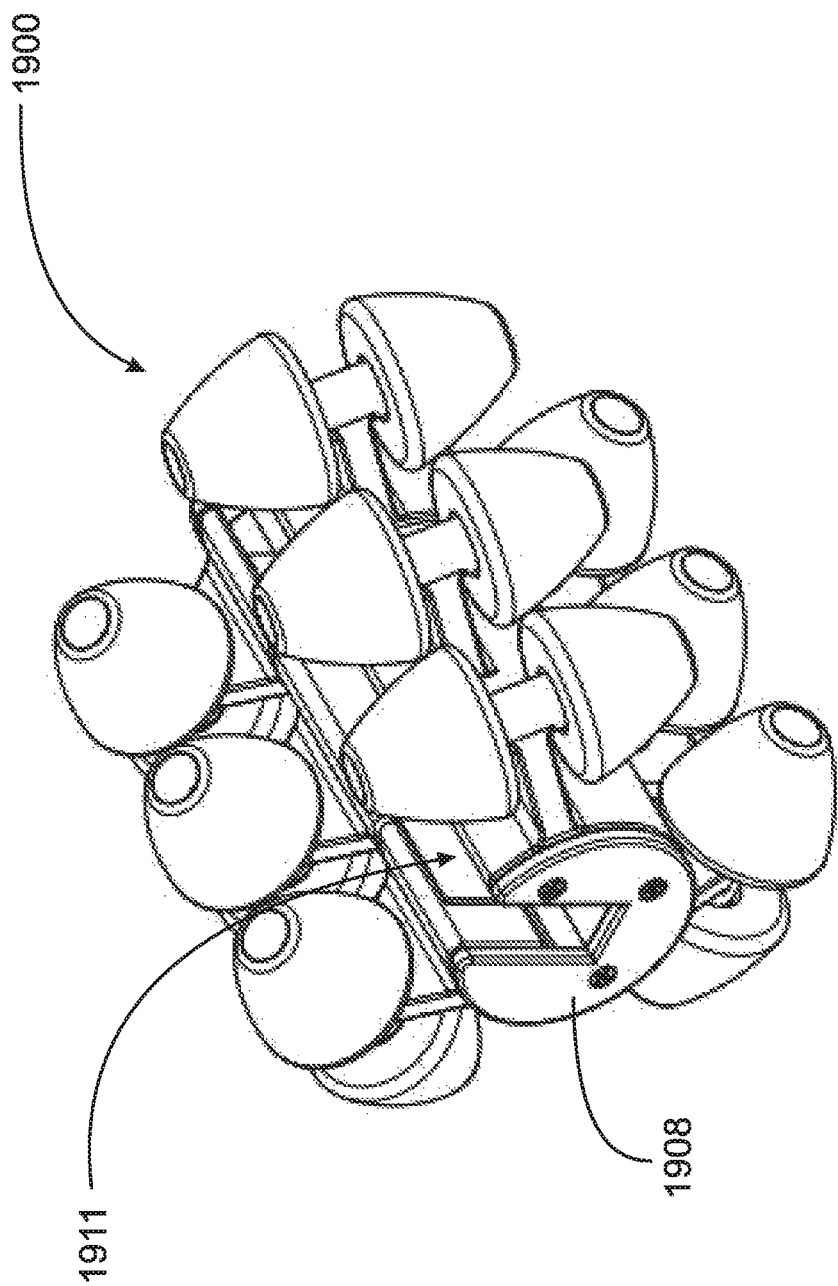
FIG. 25 is a perspective view illustrating a roller assembly in a fully open state in an embodiment of the invention.

The center base 1901 has a central, substantially rectangular channel 1911 for a hose or conduit, cap 1908 has a matching channel opening 1911, and each of the outer bases 1902 and 1903 have a corresponding opening 1911 that is shown in FIG. 19 as oriented such that with outer base 1902 and 1903 assembled to the center base, the openings in the outer bases are aligned with channel 1911, such that the assembly may be placed over a hose or conduit. FIG. 25 illustrates this circumstance, with channel 1911 open through the length of the roller assembly.

With the outer bases 1902 and 1903 engaged to the center base 1901, the outer bases may be rotated through a limited arc clockwise relative to the center base 1901, such that the openings in the outer bases no longer line up with channel 1911 of the center base, and a hose or conduit in the channel is captured. The roller assembly is thus engaged to the hose or conduit.

It may be seen that once the roller assembly 1900 is engaged to the hose or conduit to be carried, the roller assembly 1900 may be removed from the hose or conduit just by rotating the outer bases 1902 and 1903 so the openings in the outer bases align with channel 1911 of the center base 1901.

Figure 20:
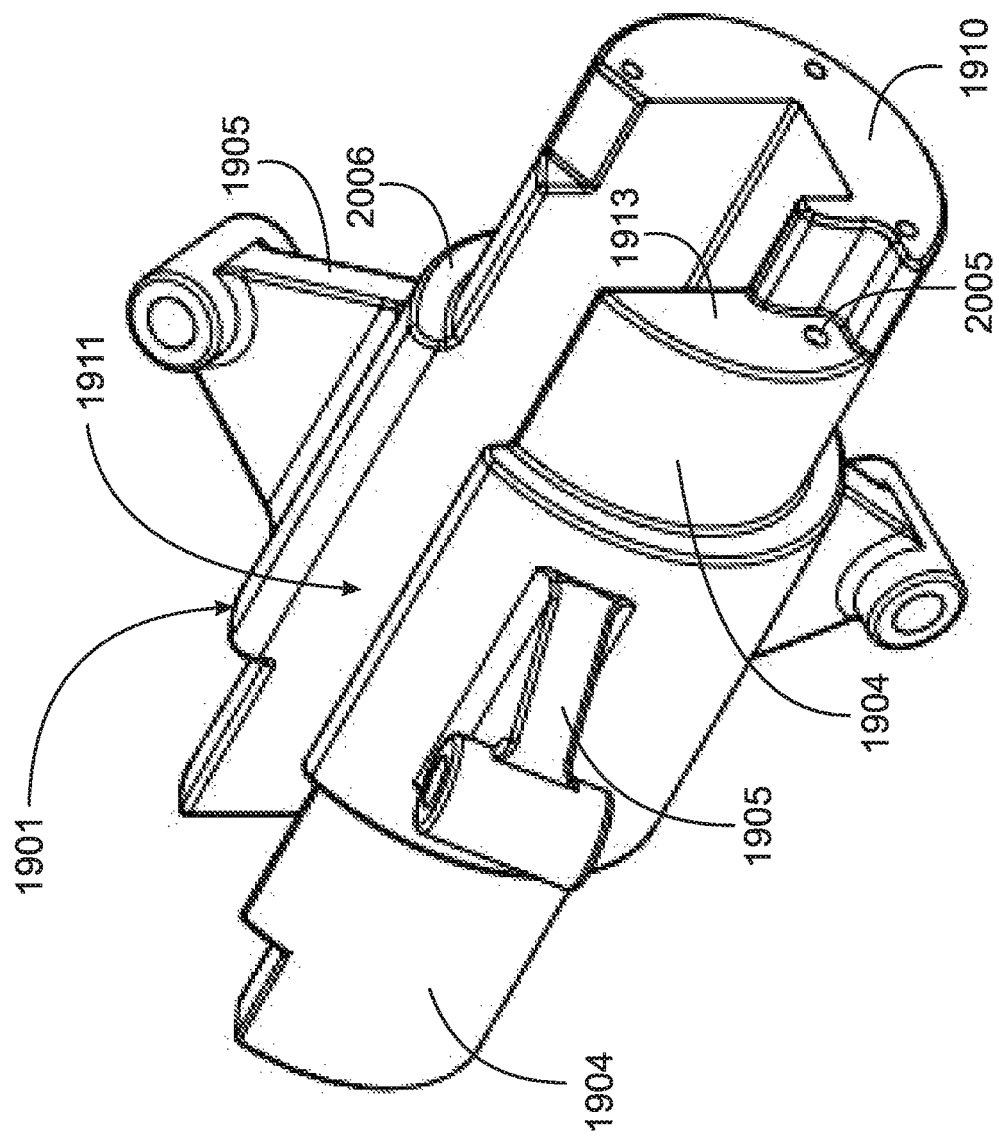
FIG. 20 is a perspective view of a center base element of the roller assembly of FIG. 19 in an embodiment of the invention.
Figure 21:
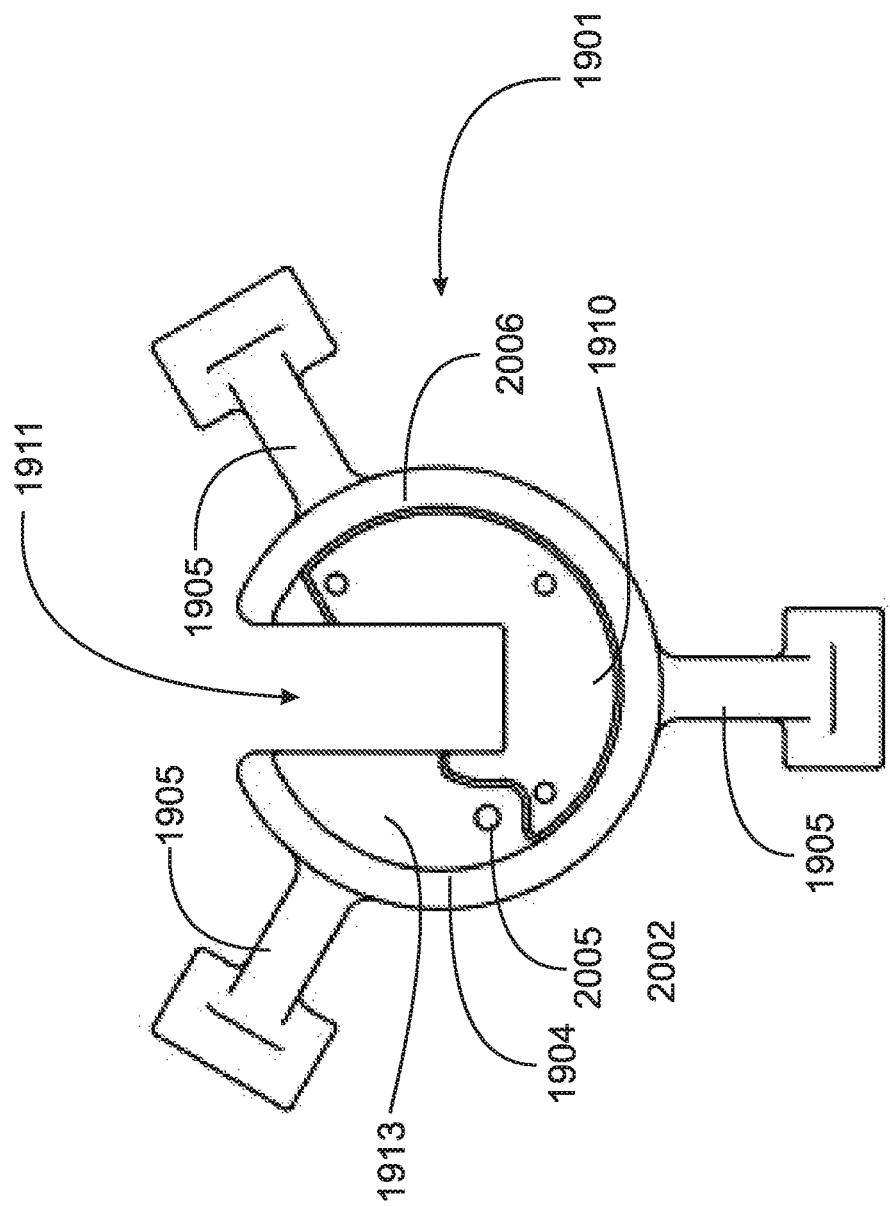
FIG. 21 is a face-on view of the center base element of FIG. 20.

FIG. 20 is a perspective view of center base 1901 from a different viewpoint than that of FIG. 19. Extension 1904 with end surface 1910 containing threaded holes, and inner surface 1913 containing dimple 2005, contact shoulder 2006, and appendages 1905 without rollers 1906 may be seen more clearly without the outer base 1902 in the same view. Again, it may be seen that channel 1911 extends the full length of the center base 1901. FIG. 21 is a straight-on view of center base 1901 showing the elements already indicated in FIG. 20.

Figure 22:
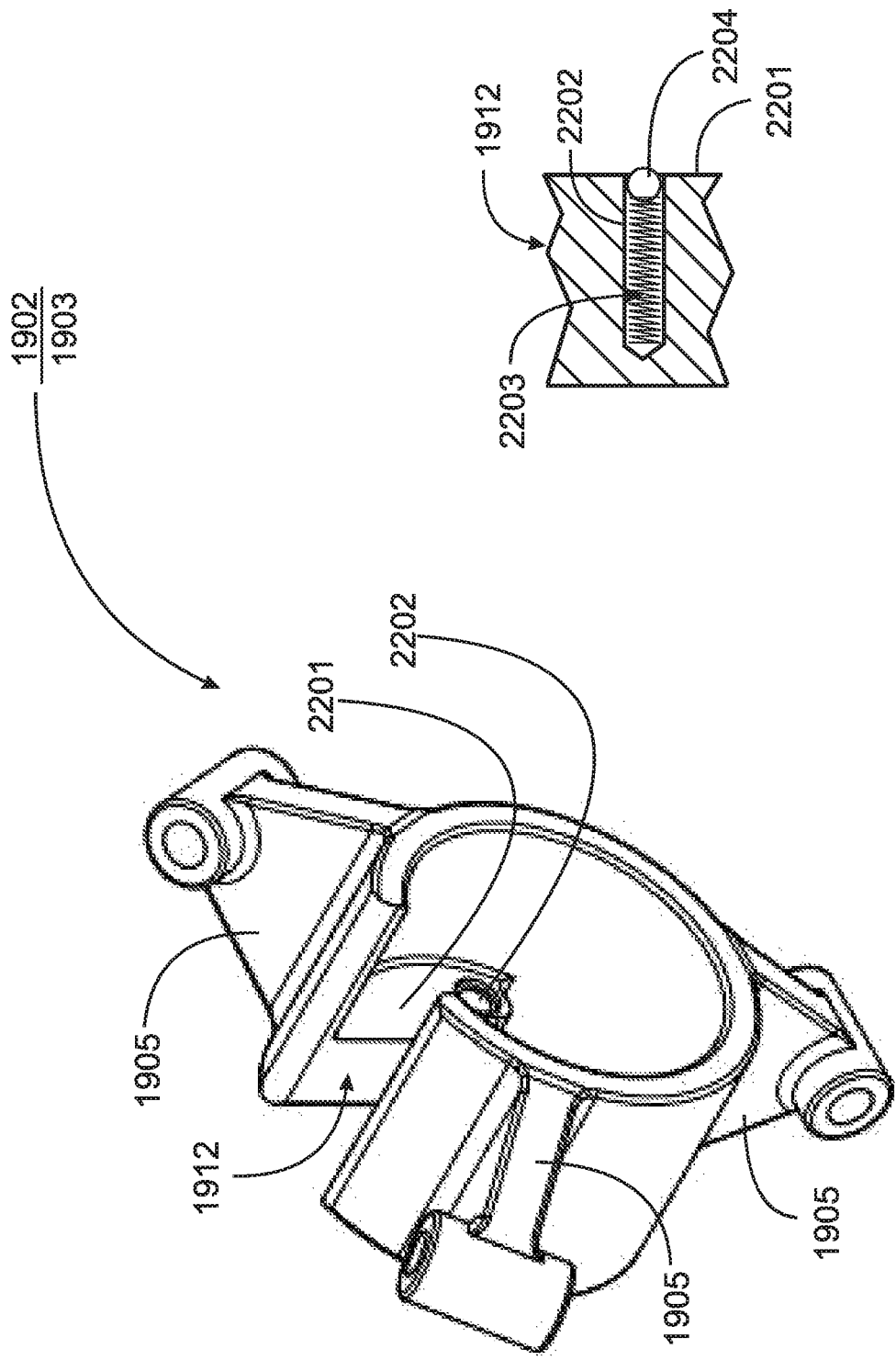
FIG. 22A is a perspective view of an outer base element of the roller assembly in an embodiment of the invention.
FIG. 22B is a partial section view showing a spring-loaded ball in a bore in an embodiment of the invention.

FIG. 22A is a perspective view of outer base 1902 (same as 1903) from a viewpoint that shows a back surface 2201 of inner structure 1912 described above with reference to FIG. 19. A bore 2202 is inset partially through surface 2201 and into structure 1912, but not all the way through. FIG. 22B is a partial section of through structure 1912 illustrating bore 2202, a compression spring 2203, and a ball 2204. With outer base 1902 (1903) engaged to the center base extension 1904, ball 2204 bears on vertical surface 1913 of center base 1901, with the force of spring 2203. As the outer base rotates to capture a hose, ball 2204 tracks a circular arc path along surface 1913.

Referring again to FIGS. 20 and 21, there is a dimple 2005 of partial semispherical shape in surface 1913 at a position that ball 2204 engages the dimple 2005 when outer base 1902 (1903) is rotated relative to center base 1901, that the opening in the outer base 1902 aligns with channel 1911, so the roller assemble 1900 may be placed on or removed from a hose or a conduit.

Figure 23:
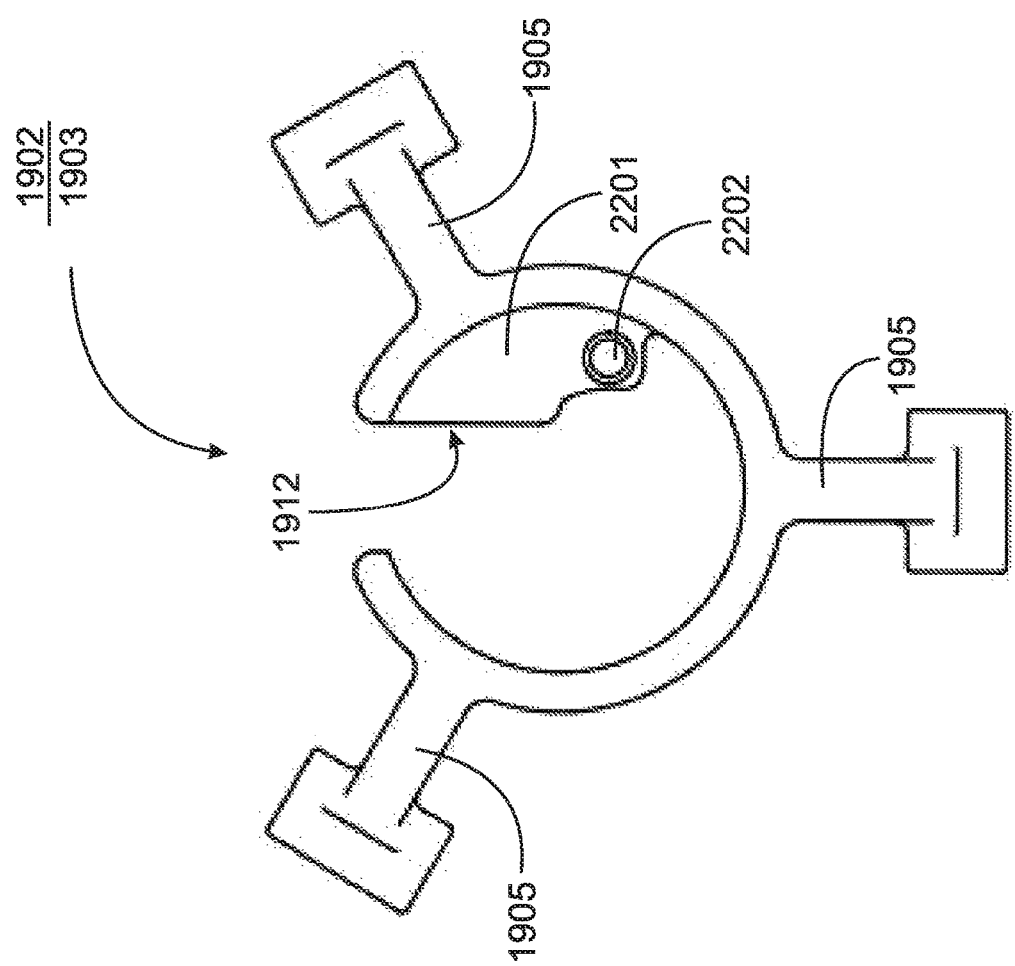
FIG. 23 is a face-on view of the outer base element of FIG. 22A in an embodiment of the invention.

FIG. 23 is a straight-on view in the axis direction of outer base 1902 (1903) again illustrating structure 1912, appendages 1905, surface 2201, and bore 2202.

Figure 24:
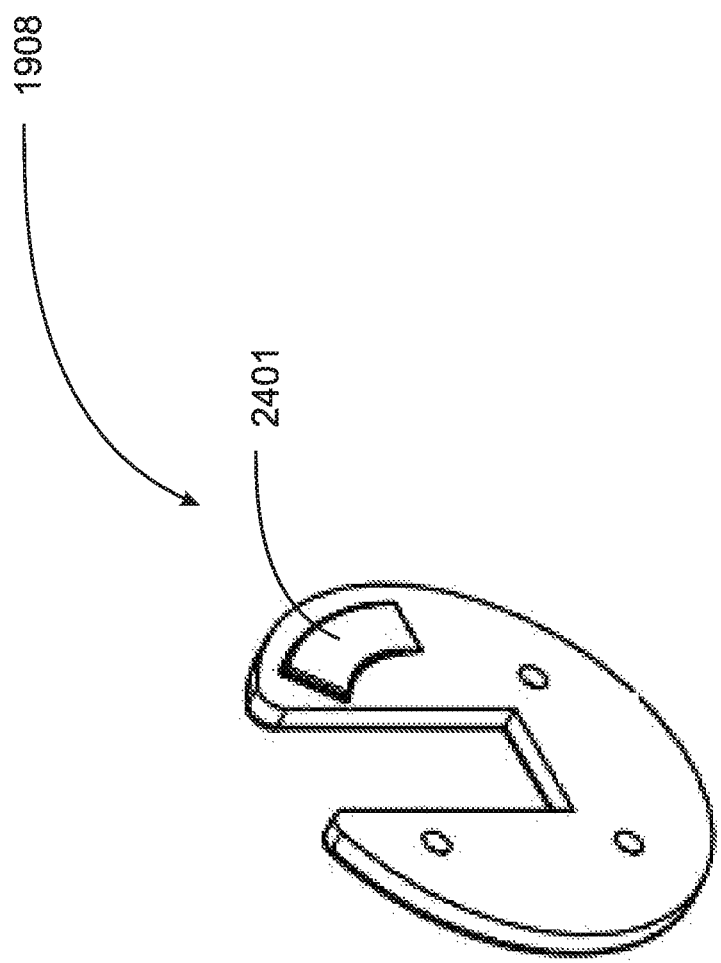
FIG. 24 is a perspective view of a cap in an embodiment of the invention.

FIG. 24 is a perspective view of cap 1908 from a viewpoint to show an opposite surface of the cap 1908 than that seen in FIG. 19. It may be seen that cap 1908 has a molded ramp 2401 for an arc length along a circular path. One end of this ramp is at the level of the back surface of the cap. The other end of this ramp is at a height from the surface. Referring again to FIG. 19, a small follower bar 1914 is molded to protrude from surface 1907 such that, with the outer base engaged such that the opening in the base is aligned with channel 1911, follower bar 1914 is just at the surface end of ramp 2401. As the outer base is rotated clockwise relative to center base 1901, the follower bar 1914 tracks up the ramp 2401, which urges the outer base 1902 toward the center base 1901 against the force of the spring-loaded ball 2204. When the follower bar 1914 passes the higher end of the ramp 2401, the follower bar drops behind the edge of the ramp, which serves to constrain the outer base 1902 from rotating back counterclockwise. At this point the opening in the outer base 1902 is no longer aligned with channel 1911. There being two outer bases 1902 and 1903, both with caps 1908 with ramps 2401, both outer bases may be rotated counterclockwise relative to the center base 1901, until both follower bars drop behind the high end of the respective ramps, in which circumstance the openings in the outer bases no longer align with channel 1911, and the roller assembly is securely joined to the hose or conduit.

To remove the roller assembly 1900 from the hose or conduit, the user pushes the outer bases 1902 and 1903 against the force of the spring-loaded ball 2204, raising the follower bars 1914 above the edge of the ramps 2401, and rotates the outer bases counterclockwise relative to the center base 1901. The spring-loaded balls will fall into dimples 2005 at the orientation where the openings in the outer bases align with channel 1911 of the center base. The roller assembly 1900 is then open and may be removed from the hose or conduit. Cap 1908 also contains through-holes which are just larger than the threaded diameter of screw fasteners 1909 from FIG. 19.

FIG. 25 has been introduced and described above as illustrating a roller assembly 1900 with the outer bases 1902 and 1903 positioned such that the internal channel 1911 through the roller assembly 1900 is full open, and a hose or conduit may be placed in the channel 1911, or more properly, the roller assembly 1900 may be assembled to the hose or conduit. Cap 1908 is shown attached through outer base 1902 into center base 1901.

FIGS. 26A and 26B show roller assembly 1900 with both of the outer bases 1902 and 1903 rotated clockwise relative to center base 1901, so the channel 1911 is no longer open at each end. Cap 1908 is shown attached through outer base 1902 into center base 1901. As the outer bases are rotated (see FIG. 19) follower bar 1914 on the outward face of structure 1912 for each outer base follows ramp 2401 on the inner surface of cap 1908 on each end, urging the outer bases toward the inner base, until the outer bases contact shoulder 2006 (see FIG. 20).

As the outer base is rotated relative to the center base, and edge of structure 1912 (see FIG. 19) that in the full open position is aligned vertically with the edge of channel 1911, rotates to urge against a hose or conduit that may be in channel 1911. This happens with both outer bases, and this impingement against the hose or conduit prevents the roller assembly from sliding along the hose or conduit.

The skilled person, having viewed FIGS. 10 through 26B and having read the descriptions of FIGS. 19 through 26B, will understand the structure and operation of roller assembly 1900, and how the assembly may be opened by counterclockwise relative rotation of the outer bases with the center base, the roller assembly may be removed, and perhaps repositioned on a another place on a hose or conduit, and that a plurality of roller assemblies 100 may be added to a hose or conduit and closed against the hose or conduit. It will also be apparent to the skilled person that roller assembly 1900 need not be disassembled to add or remove to a hose or conduit, but only relative rotation of the outer bases is necessary.

It will be apparent to the skilled person that there may be a variety of ways to implement elements to engage the outer bases with the inner base, and the descriptions above are exemplary. There will be equivalent apparatus that may be implemented in other embodiments within the scope of the invention. Further, there may be many alterations in dimensions and materials, as well, other than the dimensions and materials indicated in examples thus far. The invention is thus limited only by the claims that follow.

I claim:

1. A roller assembly providing rolling support for a hose or conduit, comprising:

a center base element implemented in a partly cylindrical shape having a central axis, a middle portion having a first length and a first diameter, opposite end portions extending from the middle portion, each of a second diameter smaller than the first diameter and of a second length, and a channel of a channel width and a channel depth along a full length open to one side of a size to accept a hose the hose or conduit;

outwardly extending projections equally spaced around the middle portion, the outwardly extending projections having carrier wheels mounted on axles;

two outer base elements each having a cylindrical inner bore of a third diameter of a dimension providing a slip fit over the second diameter of the opposite end portions, the outer base elements each having a length shorter than the length of the end portions, and a side opening of a width equal to a width of the channel along a full length of the center base element, the outer base elements mounted over each of the opposite end portions;

outwardly extending projections equally spaced around each of the outer base elements, the outwardly extending projections having carrier wheels mounted on axels;

cap disks mounted on each end of the center base element, at the end of each opposite end portion, the cap disks having a diameter larger than the second diameter of the end portions, and an opening matching the width and depth of the channel, the cap disks capturing the two outer base elements on the end portions of the center base element, allowing the outer base elements to rotate in a limited arc, around each of the end portions of the center base element;

wherein the outer base elements may be positioned in rotation to position the side openings in the outer base elements to align with the channel along the length of the center base element, such that the roller assembly are placed over a hose or conduit, and wherein the outer base elements may be rotated relative to the center base element so the side openings no longer align with the channel, and the hose or conduit is captured in the roller assembly.

2. The roller assembly of claim 1 further comprising spring-loaded balls in axis-oriented bores in structures within each of the outer base elements, the balls tracking on vertical surfaces of the center base element, with a dimple in the vertical surfaces of the center base element in the path of each ball, such that the balls drop in the dimples with the outer base elements oriented to align the side openings with the channel, enabling placement of the roller assembly over the hose or conduit.

3. The roller assembly of claim 1 further comprising a ramp implemented in a circular arc on a backside of each of the cap disks, and a protruding follower bar on a facing surface of each of the structures within each of the outer base elements, such that as an outer base element is rotated from an open position, the follower bar tracks up the ramp, urging the outer base element toward the middle portion of the center base element, until the outer base element contacts a shoulder of the center base element, constraining the outer base element in the closed position.

4. The roller assembly of claim 2 wherein, as one of the outer base elements rotates relative to the center base element, an edge of the structure within the outer base element contacts and urges against a hose or conduit in the channel.

5. The roller assembly of claim 1 wherein there are three outwardly extending structures equally spaced around each of the middle portion of the center base element and each of the outer base elements, for a total of nine outwardly extending structures, each outwardly extending structure having two axels with carrier wheels, for a total of eighteen wheels for the roller assembly.

* * * * *